US012686094B2

(12) United States Patent
Wang et al.

(10) Patent No.: US 12,686,094 B2
(45) Date of Patent: Jul. 21, 2026

(54) METHOD FOR MANUFACTURING A GLASS WAFER OF HIGH QUALITY, GLASS WAFER, GLASS PART ELEMENT, STACK, AUGMENTED REALITY DEVICE AND USE

(71) Applicant: SCHOTT Glass Technologies (Suzhou) Co. Ltd., Suzhou (CN)

(72) Inventors: Alex Wang, Suzhou (CN); Helen Fang, Suzhou (CN); Zhengyang Lu, Suzhou (CN); Clemens Ottermann, Hattersheim (DE); Stefan Weidlich, Suzhou (CN)

(73) Assignee: SCHOTT Glass Technologies (Suzhou) Co. Ltd., Suzhou (CN)

( * ) Notice: Subject to any disclaimer, the term of this patent is extended or adjusted under 35 U.S.C. 154(b) by 330 days.

(21) Appl. No.: 18/463,840

(22) Filed: Sep. 8, 2023

(65) Prior Publication Data

US 2023/0415294 A1 Dec. 28, 2023

Related U.S. Application Data

(63) Continuation of application No. PCT/CN2021/079914, filed on Mar. 10, 2021.

(51) Int. Cl.
| | |
|---|---|
| *B24B 9/08* | (2006.01) |
| *B24B 37/04* | (2012.01) |
| *C03B 25/00* | (2006.01) |
| *C03C 3/062* | (2006.01) |
| *C03C 3/064* | (2006.01) |

(Continued)

(52) U.S. Cl.
CPC .............. *B24B 9/08* (2013.01); *B24B 37/042* (2013.01); *C03B 25/00* (2013.01); *C03C 3/062* (2013.01); *C03C 3/064* (2013.01); *C03C 3/066* (2013.01); *C03C 3/068* (2013.01); *C03C 3/127* (2013.01); *C03C 3/14* (2013.01); *C03C 3/15* (2013.01); *C03C 3/155* (2013.01); *C03C 3/16* (2013.01);

(Continued)

(58) Field of Classification Search
CPC ......... B24B 37/042; B24B 9/08; C03B 25/00; C03C 27/06; C03C 3/062; C03C 3/064; C03C 3/066; C03C 3/068; C03C 3/127; C03C 3/14; C03C 3/15; C03C 3/155; C03C 3/16; C03C 3/19; C03C 3/21
See application file for complete search history.

(56) References Cited

U.S. PATENT DOCUMENTS

| | | | |
|---|---|---|---|
| 2015/0218043 A1 | 8/2015 | Ikenishi et al. |
| 2020/0041794 A1 | 2/2020 | Damm |

FOREIGN PATENT DOCUMENTS

| | | |
|---|---|---|
| CN | 110270891 A | 9/2019 |

OTHER PUBLICATIONS

"Glass and glass-ceramics—Knoop hardness test", ISO 9385, First Edition, May 1, 1990 (8 pages).

(Continued)

*Primary Examiner* — Lawrence D Ferguson
(74) *Attorney, Agent, or Firm* — TAYLOR & EDELSTEIN, PC

(57) ABSTRACT

A method for manufacturing a glass wafer for augmented reality applications includes the steps of: providing the raw wafer; edge-grinding of the raw wafer; lapping the raw wafer; rough polishing the raw wafer; fine polishing the raw wafer to obtain an intermediate wafer; gluing the intermediate wafer on a flat carrier; performing single-side polishing of a first main side of the intermediate wafer; and performing single-side polishing of a second main side of the intermediate wafer.

16 Claims, 15 Drawing Sheets

(51) Int. Cl.

| | |
|---|---|
| *C03C 3/066* | (2006.01) |
| *C03C 3/068* | (2006.01) |
| *C03C 3/12* | (2006.01) |
| *C03C 3/14* | (2006.01) |
| *C03C 3/15* | (2006.01) |
| *C03C 3/155* | (2006.01) |
| *C03C 3/16* | (2006.01) |
| *C03C 3/19* | (2006.01) |
| *C03C 3/21* | (2006.01) |
| *C03C 27/06* | (2006.01) |

(52) U.S. Cl.
CPC .................. *C03C 3/19* (2013.01); *C03C 3/21* (2013.01); *C03C 27/06* (2013.01)

(56)                    References Cited

OTHER PUBLICATIONS

"Oberflächenkenngrößen in der Praxis", Rauheit sicher bestimmen, Din En Iso 4287 (2 pages).
International Search Report dated Dec. 21, 2021 for International Patent Application No. PCT/CN2021/079914 (6 pages).

METHOD FOR MANUFACTURING A GLASS WAFER OF HIGH QUALITY, GLASS WAFER, GLASS PART ELEMENT, STACK, AUGMENTED REALITY DEVICE AND USE

CROSS REFERENCE TO RELATED APPLICATIONS

This is a continuation of PCT application no. PCT/CN2021/079914, entitled "METHOD FOR MANUFACTURING A GLASS WAFER OF HIGH QUALITY, GLASS WAFER, GLASS PART ELEMENT, STACK, AUGMENTED REALITY DEVICE AND USE", filed Mar. 10, 2021, which is incorporated herein by reference.

BACKGROUND OF THE INVENTION

1. Field of the Invention

The present invention relates to augmented reality devices, and, more particularly, to glass wafers.

2. Description of the Related Art

Augmented reality (AR) is used for displaying computer-generated perceptual information, in particular visual information, concerning objects residing in the real world.

AR devices have recently gained increased importance. In particular, AR displays can be rendered on devices resembling eyeglasses, also known as eye-pieces. Such AR devices may display computer-generated visual information projected through or reflected off the surfaces of the lens pieces of the devices. Optical waveguides are a necessary component for most of such AR devices. In particular, optical waveguides may be provided as light guide plates. Generally, light guide plates are planar wafer-like structures that are used for transmitting light. Thus, light is fed into the light guide plate at one position, is transmitted through the light guide plate and leaves the light guide plate at another position. More precisely, the light propagates within the light guide plate along a propagation path extending in a main propagation direction from the one position to another position in that the respective light beam experiences a plurality of total inner reflections at the main surfaces of the light guide plate.

Optical waveguides such as light guide plates are known, also for use as "eye pieces" in glasses for AR. However, a problem with current optical waveguides is that the computer-generated visual information of the AR devices has comparably low visual quality. That low quality may manifest itself in the form of low contrast, low resolution or in the form of a blurred image.

What is needed in the art is to overcome the problems of the prior art and to improve the visual quality of the computer-generated visual information presented to a person in augmented reality devices.

SUMMARY OF THE INVENTION

The present invention relates to a method for manufacturing a glass wafer of high quality, a glass wafer, which optionally can be or is manufactured by such a method, a glass part element, which optionally is or can be a part of such a glass wafer, and to a stack including two or more such glass part elements. The invention also relates to an augmented reality device including a respective glass wafer, glass part element and/or stack. The invention also relates to a use of a respective glass wafer, glass part element and/or stack in an augmented reality device.

The present invention provides, according to a first aspect, a method for manufacturing a glass wafer for augmented reality applications from a raw wafer, the method including:

Providing a raw wafer;

Edge-grinding of the raw wafer;

Lapping the raw wafer;

Rough polishing the raw wafer;

Fine polishing the raw wafer to obtain an intermediate wafer;

Gluing the intermediate wafer on a flat carrier;

Performing single-side polishing of a first main side of the intermediate wafer; and Performing single-side polishing of a second main side of the intermediate wafer.

It is a surprising finding underlying the present invention that augmented reality (AR) computer-generated visual information of particular high visual quality can be presented to a person if the total inner reflections the light beams experience while propagating within the glass wafer takes place under angles of total reflection which are identical or change only within certain limits for light beams which are parallel when being coupled into the glass wafer.

This is because during practical AR applications, the light beams representing a single pixel of the visual information to be presented are coupled into the light guide plates, i.e. into the glass wafer or parts thereof, as a bundle of typically parallel beams at a feeding area via a (first) coupling structure. At some defined area of the light guide plates, the beams leave the glass material at a releasing area via another (second) coupling structure. However, each time the individual light beams of the bundle hit the releasing area they leave the glass material only with a certain probability. Hence, some light beams propagate a longer distance within the glass material of the light guide than others until they leave the glass material of the glass wafer, hence, they experience more total inner reflections than others.

In that the change of the angles of total inner reflection is limited, also the angles of release (which for each light beam depends inter alia on the angle of its last total inner reflection prior to leaving the glass wafer) of the individual light beams of the bundle are all similar within certain limits. Thus, the light beams, which initially have been parallel to each other, are also quasi-parallel to each other once they left the glass wafer across the releasing area—even though they might have at least partly experienced a different number of total inner reflections (since they may leave the glass material at different positions of the releasing area due to probability statistics). "Quasi-parallel" here means that the respective light beams can still be regarded as parallel for practical applications. This is because even released light beams which enclose a certain angle with each other still reach a person's retina (or in general some detecting way) at the same or nearly the same point. As a consequence, the pixel of visual information is still of high quality, e.g. non-blurred, hence, sharp.

It has surprisingly turned out that glass wafers which are manufactured with the proposed method lead to wafers of exceptional properties with respect to a constant angle of total inner reflection for initially parallel beams. The inventors found in this respect that the interplay between the individual steps provide highly improved properties, such as geometric parameters and/or conditions of the first and second main surface. Especially, this allows that the first and second main surfaces both are particularly flat and smooth as well as oriented parallel to each other to a high degree. As a result, total inner reflections of light beams propagating within the glass wafer occur under angles of total inner reflection which do not change or change only within limits. Thus, the above-mentioned condition is met that light beams which refer to the information of one pixel and which are fed into the light guide plates in a manner parallel also leave the light guide plates in a way that the beams deviate from parallel beams only within limits. In other words, there is no, or no significant, "accumulation" and/or variation of the angle of total inner reflection across the propagation path for the beams of such a bundle. Therefore, it is not relevant at which point of the releasing area the individual beams leave the glass wafer.

Of course, this is just one option as to how to achieve a high thickness uniformity. It might be in principle also possible that each main surface is not flat but that both main surfaces are similarly shaped and, thus, the thickness uniformity is still very good.

Hence, in other words, if the thickness of the glass wafer is everywhere similar, the wafer is suitable for providing visual information of high visual quality. Of course, light beams which are not parallel to each other at the beginning will experience total inner reflections under different angles of total inner reflections.

Thus, the glass wafers manufactured with the proposed method provide the capability for presenting visual information in high visual quality. Hence, the respective glass wafers can be employed as light guide plates providing an improved visual quality, especially in AR applications and/ or AR devices.

Thus, the glass wafers manufactured with the proposed method are particularly well-suited for glass part elements which are cut out from the manufactured glass wafer. These glass part elements may be used as eye-pieces in AR devices.

At the same time, the method is reliable and can be processed in a quite straight-forward manner. This keeps the manufacturing costs of the glass wafers low. Furthermore, implementation of the method is possible in an easy way. Furthermore, retrofitting of existing processes with the proposed method is also possible. The advantageous effects of the proposed method can, thus, also be employed in existing manufacturing sites.

The proposed method, thus, allows manufacturing of glass wafers which may serve as optical waveguides such as light guide plates for AR devices, and such optical waveguides are capable of providing computer-generated visual information with a significant improved visual quality.

Especially, it is noted that with the proposed method glass wafers can be manufactured which are designated to be used as source for glass part elements which in turn are used as eye-pieces in AR applications for the purpose of providing visual information of high visual quality to a user, such as a person.

In one embodiment, with the method glass wafers are manufactured which are very thin, such as 2 mm or less, optionally 1.5 mm or less, optionally 1.3 mm or less, optionally 1 mm or less.

In one embodiment, with the method glass wafers are manufactured which have a high thickness uniformity. For example the glass wafer may have a Total Thickness Variation (TTV) which is smaller than 2 μm.

In one embodiment, the wafer, or parts thereof, manufactured with the proposed method can be used or is used to cut out glass part elements from the glass material of the wafer. Especially, the glass part elements may serve as basic parts for eye-pieces for glasses in AR devices.

In one embodiment it might be optional that providing the raw wafer includes:

Melting glass and obtaining a solid glass strip from the molten glass;

Annealing the glass strip;

Cutting the glass strip into one or more glass blocks;

Gluing two or more glass blocks together in order to obtain a glass batch;

Wire-sawing the glass batch in order to manufacture thin substrates close to the final thickness of the proposed glass wafer, for example deviating 10 μm or less, optionally 5 μm or less, from the final thickness, and/or in order to saw multiple glass blocks simultaneously; and/or Cutting the raw wafer out of the glass batch.

Providing the raw wafer can, hence, be carried out in a quite straight-forward and cheap but still reliable manner. This allows in addition that the proposed method can be employed also in existing manufacturing sites in a very efficient manner.

Optionally, in the wire-saw processing, in general in this application, a thick glass block is cut with multiple wires (like cheese-cutters) into two or more glass plates. Those plates may then later be lapped and/or polished to the final wafer.

In one embodiment it might be optional that:

(i) the glass material of the wafer has a refractive index of between 1.3 and 2.5, optionally of between 1.5 and 2.3, optionally of between 1.5 and 2.1, optionally of between 1.7 and 2.1, optionally of 1.8, at 587.562 nm;

(ii) the maximal extension of the manufactured glass wafer, optionally its diameter, is (a) 100 mm, 150 mm, 200 mm or 300 mm and/or (b) between 100 mm and 500 mm, optionally between 100 mm and 400 mm, optionally between 100 mm and 300 mm, optionally between 180 mm and 220 mm, optionally between 190 mm and 210 mm, optionally 200 mm;

(iii) the thickness of the manufactured glass wafer, optionally the maximal thickness across the wafer, is between 0.2 and 2 mm, optionally between 0.3 and 1 mm, optionally between 0.4 mm and 0.8 mm, optionally between 0.5 mm and 0.7 mm, optionally 0.6 mm;

(iv) the Knoop-hardness, expressed as Knoop-hardness number $HK_{0.1/20}$ of the glass material, especially of the manufactured wafer, is between 400 and 900, optionally between 450 and 850, optionally between 500 and 800; and/or (v) the Young-Modulus of the glass material, especially of the manufactured wafer, is between 1 GPa and 1000 GPa, optionally between 10 GPa and 500 GPa, optionally between 50 GPa and 200 GPa, optionally between 50 GPa and 150 GPa, optionally 93 GPa.

If the glass material of the wafer has respective parameters, the proposed method can be carried out with high reliability and with a manufactured wafer of particular high quality.

In one embodiment it might be optional that:

(i) the glass strip size is 640×210×25 mm$^3$;

(ii) the block size is 205×205×22 mm$^3$;

(iii) Wire-sawing is carried out having a wire-speed of 30 m/min, having a feed of 15 to 20 mm/h, having a SiC density of 1.1 to 1.3 g/cm$^3$ and/or having a tilt angle between the wire and the glass of 3 to 5 degrees;

(iv) Cutting the raw wafer is carried out so that the maximal extension of the raw glass wafer, optionally its diameter, is between 180 mm and 220 mm, especially between 190 mm and 210 mm, especially 201 mm, having a pressure of 0.1 to 0.2 MPa and/or having a speed of 1 m/min;

(v) Edge-grinding is carried out by having a chamfer size of between 0.05 to 0.25, having a number of cycles of 2 to 5, having a feed of between 500 to 1000 mm/min and/or having a turning speed of the tool of 20000 to 40000 rpm;

(vi) Lapping is carried out by having a removal of between 150 to 400 μm, having a pressure of between 800 N to 2000 N, having a rotational speed of between 10 to 25 rpm and/or having a slurry density of between 1.08 to 1.3 g/cm³;

(vii) Rough polishing is carried out by having a removal of between 25 to 45 μm, having a pressure of between 800 N to 2000 N, having a rotational speed of between 10 to 25 rpm and/or having a slurry density of between 1.08 to 1.3 g/cm³;

(viii) Fine polishing is carried out by having a removal of between 1 to 5 μm, having a pressure of between 400 N to 1000 N, having a rotational speed of between 10 to 25 rpm and/or having a slurry density of between 1.08 to 1.3 g/cm³;

(ix) Performing single-side polishing of the first main side is carried out by having a pressure of between 500 N to 2000 N, especially 1000 N, having a rotational speed of between 10 to 25 rpm, especially 12 rpm, having a slurry density of between 1.08 to 1.3 g/cm³, especially 1.1 g/cm³, having a hardness of the pad of between 55 and 80, especially 60, having a groove distance of between 5 mm and 30 mm, especially 20 mm; and/or (x) Performing single-side polishing of the second main side is carried out by having a pressure of between 500 N to 2000 N, especially 1000 N, having a rotational speed of between 10 to 25 rpm, especially 12 rpm, having a slurry density of between 1.08 to 1.3 g/cm³, especially 1.1 g/cm³, having a hardness of the pad of between 55 and 80, especially 60, having a groove distance of between 5 mm and 30 mm, especially 20 mm.

It has surprisingly been found that the respective parameters lead to particularly flat and smooth main surfaces of the wafer and/or to a glass wafer having a small TTV.

The surface conditions of the glass wafer can particularly be improved by using said slurry.

The present invention provides, according to a second aspect, a glass wafer, which optionally can be or is manufactured with the method according to the first aspect of the invention, the glass wafer having a first main surface and a second main surface opposite the first main surface, and the material of the glass wafer having a refractive index N, wherein for each of a plurality of sub-domains of maximal extension D of the glass wafer, which sub-domains are located within an effective domain of the glass wafer: from the wafer's thickness distribution between the first and the second main surface of the sub-domain, a specific angle ε can be determined, wherein the specific angle ε is determined as the angle of the planar contribution to the change in the thickness distribution;

wherein the glass wafer has a maximal thickness of 2 mm or less, wherein the glass wafer has a specific thickness t, wherein the glass wafer is designed such that with respect to one or more parameters for each sub-domain a local quality index LQI of the wafer is equal to or smaller than a threshold T, with the threshold T being defined as $$T = \frac{\varepsilon_{max}}{D}$$

wherein $\varepsilon_{max}$ is 360 arcsec or less;
wherein the local quality index is defined as:

$$LQI = \frac{|\varepsilon|}{t}\sqrt{N^2 - 1}$$

It is a surprising finding that a glass wafer which has properties, especially optical properties such as the refractive index and/or geometric properties such as concerning its first and second main surfaces, which meet the condition of the local quality index for a plurality of sub-domains, represents a glass wafer which is well-suited as light guiding plates for presenting visual information of high visual quality, due to preserving the parallel arrangement of initially parallel light beams to a high degree. In one embodiment, geometric properties may also refer to and/or include the thickness distribution of the glass wafer. This is useful because also wafers which are at least in some areas curved, hence, not flat, may have a uniform thickness distribution. This in turn may also be an optional glass wafer.

The local quality index directly describes the capability of the glass wafer to limit the change of the angle of the total inner reflections which are experienced by light beams propagating within the glass wafer.

Glass wafers, for which the change of the angle of total inner reflections is limited for the individual beams of a bundle of light beams initially propagating parallel to each other within the glass material of the wafer, allow that the beams are also quasi-parallel to each other once they left the glass wafer across a releasing area—even though they might have at least partly experienced a different number of total inner reflections (since they may leave the glass material at different positions of the releasing area due to probability statistics). As a consequence, the pixel of visual information is still of high quality, e.g. non-blurred, hence, sharp, for example at the position of some sensing way such as a person's retina.

Since these aspects have been discussed already above with respect to the first aspect of the present invention in detail, reference can be made to the respective parts of the description above in order to avoid unnecessary repetition here.

The proposed wafers show very uniform behavior of thickness distribution. In this application and unless stated otherwise, thickness may optionally be defined as the shortest distance between the two main surfaces of the wafer. In this respect, the thickness can for instance be measured according to SEMI MF1530-0707 and/or for transparent media, such as the wafers of the present invention, by way of an optical interferometer, especially by such interferometers as ZYGO Verifire or Tropel FlatMaster. The optical thickness determined by such interferometric measurement can thus be easily calculated into a physical thickness by taking the wafer's refractive-index and dispersion into account.

Such interferometric measurements allow for presenting a digital three-dimensional map of the wafer's thickness distribution, i.e. positions on the wafer are associated with relative differences in thickness between the wafer's thickness at the respective position to the wafer's thickness at neighboring positions.

A base-system that has proven very suitable for the expression of such thickness distributions, especially for disk-like shaped objects such as the proposed glass wafer, is the set of orthonormal Zernike-Polynomials.

Using the James C. Wyant indexing scheme for Zernike-Polynomials, which is commonly used in interferometry, especially in interferometers for ZYGO corporation, it has surprisingly been found that wafers, especially manufactured according to processes of the first aspect of the present invention, which show particularly good optical quality for their application in AR, can be approximated with sufficient accuracy for such high optical quality expressing the thickness distribution map by using the first four orders of the least-squares approximation by an orthonormal Zernike-Polynomial base-system only, i.e. by using the orders j=0, j=1, j=2 and j=3.

While the order j=0 is physically associated with a global offset in thickness, the so-called piston has a constant value at any position on the wafer and thus no effect on the thickness distribution map in the view of this invention as it does not contribute to any thickness differences between positions on the wafer. In turn j=1 and j=2 form a planar contribution to the thickness distribution, called wedge. j=3 corresponds to a rotationally-parabolic contribution to the thickness distribution, called dome or bowl depending on the central position of the object being thicker or thinner than peripheral positions respectively.

The inventors found that of particular interest to the quality of wafers for their use in AR applications is the slope, i.e. the spatial gradient, of the wedge contribution to said thickness distribution. In other words, an angle can be determined by approximation of said Zernike-Polynomials to the wafer thickness distribution that describes the angle of linear thickness increase (called slope) from a position of minimal thickness to a position of maximal thickness of the wafer within the wafer-domain under consideration. An ideal wafer would have a constant thickness at all positions and no wedge would consequently have a respective angle of 0. Having a thickness distribution of a sub-domain of the glass wafer, the angle obtained for that distribution is exactly the specific angle $\varepsilon$.

The specific angle, hence, represents indeed a physical property of the sub-domain. Thus, controlling the specific angle allows to manufacture glass wafers for presenting visual information in high visual quality. Or, in other words, a glass wafer which meets the local quality index has a limited change of the angle of the total inner reflection.

The proposed glass wafer, thus, is well-suited to present computer-generated visual information of particular high visual quality to a person since the total inner reflections that parallel light beams experience while propagating within the glass wafer take place under angles of total reflection which are identical or change only within certain limits along the propagation path so that also the angles of release are the same or nearly the same for the light beams once they left the glass wafer.

The local quality index describes physical properties of the glass wafer. The local quality index, LQI, is, thus, a practical design condition to provide glass wafers for AR applications. Especially, the local quality index is implicitly also a measure of the capability of the glass wafer—which includes an effective domain from which eye-pieces are cut out—to display visual information with a certain visual quality.

The local quality index is directly and/or indirectly based on parameters that at least in part determine the angle of total inner reflection a light beam experiences while propagating within the glass material of the wafer and furthermore that describe one or more causes of the change of the angle of total inner reflection. In that the local quality index is met, the glass wafer is designed such that the physical properties lead to said beneficial limited variation of the angle of total inner reflection.

It is particularly noted that the specific angle is related to the wedge between the two main surfaces. The specific angle can be obtained from the Zernike-Polynomial regression, as already mentioned above. This is very convenient in order to control the property of the glass wafer. For, it is based on the thickness distribution. This parameter in turn can be controlled during manufacturing in a precise manner.

A glass wafer fulfilling the requirements with respect to the local quality index for the plurality of sub-domains is, thus, designed in a way that angle of reflections do not change or change only within certain limits. Or, in other words, a bundle of light beams initially being parallel to one another when fed into the glass wafer are still quasi-parallel when they are coupled out of the glass wafer at some area of release, as described also above in greater detail (see also the first aspect of the present invention).

For a glass wafer which fulfills the local quality index, glass part elements which are cut out from the wafer's effective domain, (especially if the elements cut out correspond to the sub-domains) can optionally be used as basic parts for eye-pieces for AR applications and AR devices, such as AR glasses. Thus, respective glass part elements can be used in AR glasses to provide visual information with a high and improved visual quality.

It is particularly noted, that the proposed glass wafer may have a super flat design, since it has a maximal thickness of 2 mm or less. Of course, the thickness of the glass wafer may vary in optional embodiments, but then it is at every position 2 mm or less. Accordingly, a small TTV of 2 $\mu$m or less may be present for the proposed glass wafer.

The proposed method according to the first aspect of the present invention allows the first time to manufacture such super flat glass wafers, which are designed such as to meet the local quality index criterion for a plurality of sub-domains. Alternatively or in addition, the glass wafer may have a TTV of 2 $\mu$m or less.

It is noted that, when for each sub-domain the local quality index of the wafer is calculated, the specific angle for the respective sub-domain is used. In other words, for each sub-domain the respective local quality index is based on the specific angle determined for that sub-domain. The specific angle in turn is determined based on the Zernike-Polynomial regression for the thickness distribution of the respective sub-domain individually. However, the specific thickness and the refractive index is the same for all local quality indices.

The proposed wafer is, therefore, particular well-suited for augmented-reality applications. For example, it can be used to cut out glass part elements which represent basic parts for eye-pieces. This means, eye-pieces (such as eye-pieces used in glasses for augmented reality devices) may include such glass part elements. For this purpose, the basic parts may also be further processed, such as coated, imprinted, structured or the like.

For example, light beams may propagate within the glass wafer while experiencing total inner reflections. For this purpose, light beams may be coupled into the glass wafer at a feeding area via a first coupling structure and/or may be coupled out of the glass wafer at a releasing area via a second coupling structure.

The less the value of the LQI is, the better the glass wafer is suited for AR applications. An LQI of zero is the ideal (theoretical) optimum.

The effective domain may be defined as a domain of the wafer which is of appropriate quality to fulfill the requirements of the local quality index. The effective domain is, thus, a physical part of the glass wafer.

In one embodiment, there can be 2 or more, 3 or more, 5 or more, 10 or more, 20 or more, or 50 or more, 100 or more, 500 or more, or 1000 or more sub-domains selected for the plurality of sub-domains. Optionally there can be 10000 or less, 5000 or less, 1000 or less, 500 or less, 100 or less, 50 or less or 30 or less sub-domains selected for the plurality of sub-domains. More sub-domains provide a basis for improved overall quality results.

In one embodiment, the sub-domains may at least partially overlap.

In one embodiment, the refractive index of the glass material is the refractive index for light having a wavelength of between 587 nm and 588 nm, especially of 587.562 nm.

The person skilled in the art understands that optionally the sub-domains are parts of the glass wafer which are or can be defined. So the size of the sub-domains may be chosen for example dependent on the final purpose the glass wafer serves. For example, if the glass wafer serves as source from which glass part elements are cut out (which in turn might be used as basic parts for eye-pieces for glasses in AR devices), it might be appropriate to define the dimension, especially the maximal extension, of the sub-domains similar to the one of the glass part elements.

Optionally, it is clear for the person skilled in the art that the thickness distribution does not provide absolute values of the thickness(es) of the glass wafer, but provides the distribution concerning how the thickness at one location on the wafer compares to the thickness at another location on the wafer. The difference value of said two thicknesses at the two locations in turn then is an absolute value (i.e. no relative value). However, the absolute value of the wafer's thickness is for all locations on the wafer unknown.

In one embodiment it might be optional that:
(a) the refractive index N of the material of the glass wafer is (i) between 1.4 and 3, optionally between 1.5 and 2.5, optionally between 1.7 and 2.3, optionally between 1.8 and 2.2, optionally between 1.9 and 2.1, (ii) 1.4 or more, optionally 1.5 or more, optionally 1.6 or more, optionally 1.7 or more, optionally 1.8 or more, optionally 1.9 or more, optionally 2 or more, optionally 2.1 or more, and/or (iii) 3 or less, optionally 2.7 or less, optionally 2.5 or less, optionally 2.4 or less, optionally 2.3 or less, optionally 2.2 or less, optionally 2.1 or less, optionally 2 or less, optionally 1.9 or less, optionally 1.8 or less, optionally 1.7 or less, optionally 1.6 or less, optionally 1.5 or less; and/or
(b) the material of the glass wafer has the refractive index N for a wavelength of between 587 nm and 588 nm, especially of 587.562 nm.

A glass material having a respective refractive index is of optional interest. This is because such glass materials are particularly well-suited for AR applications and/or AR devices due to the acceptable angles under which total inner reflection may occur.

In one embodiment, especially for AR applications, the refractive index may be 1.59, 2.06, 2.1 or 2.2.

A wavelength in said range is optional because it allows to verify the local quality index for wavelengths for which the human's eye is particularly sensitive.

In one embodiment it might be optional that:
(i) the thickness of the glass wafer (a) varies for each of two positions, especially within the effective domain, by at most 5000 nm, optionally by at most 3000 nm, optionally by at most 1000 nm, optionally by at most 500 nm, optionally by at most 300 nm, optionally by at most 200 nm, optionally by at most 150 nm, optionally by at most 100 nm; and/or
(ii) the maximal thickness of the wafer is (a) 1.9 mm or less, optionally 1.8 mm or less, optionally 1.7 mm or less, optionally 1.6 mm or less, optionally 1.5 mm or less, optionally 1.4 mm or less, optionally 1.3 mm or less, optionally 1.2 mm or less, optionally 1.1 mm or less, optionally 1 mm or less, optionally 0.9 mm or less, optionally 0.7 mm or less, optionally 0.5 mm or less, optionally 0.3 mm or less, optionally 0.2 mm or less, optionally 0.1 mm or less, (b) 0.01 mm or more, optionally 0.05 mm or more, optionally 0.1 mm or more, optionally 0.3 mm or more, optionally 0.5 mm or more, optionally 0.7 mm or more, optionally 1 mm or more, optionally 1.1 mm or more, optionally 1.2 mm or more, optionally 1.3 mm or more, optionally 1.4 mm or more, optionally 1.5 mm or more, and/or (c) between 0.01 mm and 1.8 mm, optionally between 0.3 mm and 1.5 mm, optionally between 0.5 mm and 1.2 mm, optionally between 0.8 mm and 1.1 mm.

If the glass wafer's thickness in the effective domain varies only within certain boundaries, the wafer is particularly well suited for improving the light guiding capabilities, especially reducing the difference between the angles of total inner reflection of different beams of an initially parallel bundle of beams.

For example, in general, the thickness distribution of a glass wafer can be obtained from a three-dimensional representation of the glass wafer.

A three-dimensional representation of the glass wafer, which is especially appropriate for the present application, can optionally be obtained for example by way of determining the thickness variation of the glass wafer. For example, TTV may be determined based on SEMI MF 1530GBIR. TTV may also be determined based on interferometric measurements of the thickness profile of the article, for example using an interferometer, in particular an interferometer of Zygo Corporation.

In one embodiment it might be optional that each of the sub-domains:
(i) is a domain of the glass wafer which is or can be defined;
(ii) includes at least one, especially continuous, part, especially a circular or rectangular portion, of the body of the glass wafer between and inclusive of the first main surface and the second main surface;
(iii) includes (a) at least 0.1%, optionally at least 1%, optionally at least 3%, optionally at least 5%, optionally at least 6%, optionally at least 7%, optionally at least 8%, optionally at least 9%, optionally at least 10%, and/or (b) at most 80%, optionally at most 70%, optionally at most 60%, optionally at most 50%, optionally at most 40%, optionally at most 30%, optionally at most 20%, optionally at most 10%, optionally at most 5%, optionally at most 3%, optionally at most 2%, respectively, of the total glass material of the glass wafer, especially of the effective domain;

(iv) is disk-like shaped, especially has a diameter which is (a) between 1% and 80%, optionally between 5% and 60%, optionally between 10% and 50%, optionally between 15% and 40%, optionally between 20% and 35%, optionally between 25% and 30%, of the diameter of the glass wafer, (b) between 1% and 5% or between 70% and 80% of the diameter of the glass wafer, (c) 10 mm, 20 mm, 30 mm, 60 mm or 75 mm, and/or (d) between 5 mm and 75 mm, optionally between 10 mm and 65 mm, optionally between 10 mm and 60 mm, optionally between 10 mm and 30 mm, especially 20 mm, between 20 mm and 40 mm, especially 30 mm, between 30 mm and 50 mm, especially 40 mm, between 50 mm and 70 mm, especially 60 mm;

(v) has the same maximal extension D, especially the same diameter; and/or (vi) includes in at least one cross-sectional plane, especially the cross-sectional plane being arranged between the first main surface and the second main surface, a circular, an oval or a rectangular circumferential shape.

A sub-domain of respective shape is of particular interest because it can be processed in a particularly reliable and cheap manner.

The person skilled in the art understands that optionally the sub-domains are domains of the glass wafer which are or can be defined.

In one embodiment it might be optional that:

(i) each of the sub-domains is of disk-like shape, of rectangular shape and/or has the same maximal extension, especially the same diameter;

(ii) the sub-domains are at least partly overlapping; and/or (iii) the sub-domains cover (a) more than 50%, optionally more than 60%, optionally more than 70%, optionally more than 80%, optionally more than 90%, optionally more than 93%, optionally more than 95%, optionally more than 95%, of the glass wafer, especially of the effective domain, and/or (b) less than 99.9%, optionally less than 99%, optionally less than 95%, optionally less than 90%, optionally less than 80%, optionally less than 70%, optionally less than 60%, of the glass wafer, especially of the effective domain.

The proposed shape of the sub-domains is of particular interest because the geometry of the wafer outbound or the outbound of the effective-domain can be reproduced in a reliable manner by way of defining a plurality of respective arranged sub-domains.

Sub-domains having the same maximal extension are optional because the local quality index is evaluated for identical domains.

In one embodiment it might be optional that the maximal extension D of each of the sub-domains is its diameter for disk-like sub-domains and/or the maximal extension D of each of the sub-domains, such as: (i) 1 mm or more, optionally 3 mm or more, optionally 5 mm or more, optionally 10 mm or more, optionally 20 mm or more, optionally 30 mm or more, optionally 40 mm or more, optionally 50 mm or more, optionally 60 mm or more, optionally 70 mm or more, optionally 75 mm or more, (ii) 100 mm or less, optionally 90 mm or less, optionally 80 mm or less, optionally 70 mm or less, optionally 60 mm or less, optionally 50 mm or less, optionally 40 mm or less, optionally 30 mm or less, optionally 20 mm or less, optionally 10 mm or less, optionally 5 mm or less, optionally 3 mm or less, and/or (iii) between 1 mm and 100 mm, optionally between 3 mm and 90 mm, optionally between 5 mm and 80 mm, optionally between 10 mm and 70 mm, optionally between 30 mm and 70 mm, optionally between 20 mm and 60 mm, optionally between 40 mm and 60 mm, most optionally 60 mm, 50 mm, 40 mm, 30 mm or 20 mm.

In one embodiment each of the sub-domains has at least one maximal extension D, especially wherein the maximal extension is its diameter for disk-like sub-domains, which is between 10 mm and 40 mm.

Glass part elements which are cut out from the glass wafer, especially for AR devices, may have the proposed extensions. Thus, a design of the glass wafer which fulfills the local quality index for accordingly defined sub-domains provides a glass wafer of high quality for AR devices.

In one embodiment it might be optional that the effective domain:

(i) is a domain of the glass wafer which is or can be defined;

(ii) includes at least one part, especially a central portion, of the body of the glass wafer between and inclusive of the first main surface and the second main surface;

(iii) includes (a) at least 10%, optionally at least 20%, optionally at least 30%, optionally at least 50%, optionally at least 60%, optionally at least 70%, optionally at least 80%, optionally at least 90%, optionally at least 95%, and/or (b) at most 99.99%, optionally at most 99%, optionally at most 95%, optionally at most 90%, optionally at most 85%, optionally at most 80%, optionally at most 70%, optionally at most 50%, respectively, of the total glass material of the glass wafer;

(iv) is disk-like shaped, especially having a diameter (a) which is 50% or more, optionally 60% or more, optionally 70% or more, optionally 80% or more, optionally 90% or more, optionally 95% or more, optionally 99% or more, of the diameter of the glass wafer, (b) which is 100% or less, optionally 99% or less, optionally 96% or less, optionally 91% or less, optionally 81% or less, optionally 71% or less, optionally 61% or less, optionally 51% or less, of the diameter of the glass wafer, and/or (c) which is 290 mm, especially for a wafer having a diameter of 300 mm, or is 90 mm, especially for a wafer having a diameter of 100 mm; and/or (v) includes in at least one cross-sectional plane, especially the cross-sectional plane being arranged between the first main surface and the second main surface, a circular, an oval or a rectangular circumferential shape.

An effective domain of respective shape is of particular interest because it can be processed in a particular reliable and cheap manner. Furthermore, for many applications with the proposed shapes a maximum number of glass part elements can be cut out from the effective domain. This is very efficient.

In one embodiment the effective domain may include at least one central part of the glass wafer. In such a case, the borders of the wafer can be neglected for evaluation of the local quality index. This is a quite practical scenario since due to processing-related circumstances, the borders of a wafer might have a surface structure and thickness distribution so that glass part elements cut out from such parts of the wafer might not be appropriate for high quality applications.

The person skilled in the art understands that optionally the effective domain is a domain of the glass wafer which is or can be defined. For example, depending on the structure of the glass wafer in the circumferential region, the effective domain might be defined so as to not enclose the circumferential region (or at least parts thereof).

For example, in one embodiment the effective domain might be chosen such that the diameter of the effective domain is 50%, 60%, 70%, 80, 90%, 95% or 99% of the diameter of the glass wafer.

In one embodiment it might be optional that the specific thickness is the minimal thickness, the maximal thickness, and/or the mean thickness the glass wafer has, especially across the effective domain.

The minimal thickness and the maximal thickness can be determined in a reliable manner. For example, said (absolute) values can be determined by way of a tactile precision probe (for example from company Heidenhain) or by way of an optical distance measuring device (for example from company Precitec). Likewise, also the mean thickness can be determined in a reliable manner, especially by way of appropriate software programs.

In one embodiment it might be optional that the planar contribution is determined by the contribution of the orders 1, especially being the wedge contribution in one direction, and 2, especially being the wedge contribution in another perpendicular direction, of the expression of the thickness distribution using a least-squares-approximation with Zernike-Polynomials, wherein the orders are expressed by the indexing scheme of James C. Wyant, wherein optionally such planar contribution to the change in the thickness distribution may also be regarded as the wedge, and hence the specific angle $\varepsilon$ is the slope-angle of this wedge.

Especially it is noted that the planar contribution to the change in the thickness distribution may also be regarded as the wedge, and hence the specific angle $\varepsilon$ is the slope-angle of this wedge.

In one embodiment it might be optional that the one or more parameters is/are selected from the group of parameters including:

Global wedge;

Global dome and/or bowl;

topology of the first main surface;

topology of the second main surface;

maximal thickness of the wafer at least within the effective domain, especially controlling that the thickness has a maximal value of 2 mm;

minimal thickness of the wafer at least within the effective domain, especially controlling that the thickness has a minimal value of 0.01 mm;

thickness variation of the wafer at least within the effective domain, especially controlling that the thickness variation is smaller than 2 μm;

roughness, especially at least one mean roughness $R_a$, of the first main surface, especially controlling that the roughness has a maximal value of 5 nm or less; and/or roughness, especially at least one mean roughness $R_a$, of the second main surface, especially controlling that the roughness has a maximal value of 5 nm or less.

It turned out that the local quality index can be obtained for the individual sub-domains in a reliable and particularly cheap manner if the wafer, especially the main surfaces, is designed taking said parameters into account. Especially if the parameters are met, i.e., certain conditions with respect to minimal and/or maximal values, an optional glass wafer with a low, hence well-suited, LQI can be obtained.

Especially with the method according to the first aspect of the present invention, the respective parameters can be addressed in a particularly precise and robust manner.

For example, absolute thickness information can be determined from a respective optical thickness measurement or the like of the glass wafer, an example for which has been described above.

In one embodiment it might be optional that the angle $\varepsilon_{max}$ is 300 arcsec or less, optionally 240 arcsec or less, optionally 180 arcsec or less, optionally 120 arcsec or less, optionally 90 arcsec or less, optionally 60 arcsec or less, optionally 45 arcsec or less, optionally 30 arcsec or less, optionally 20 arcsec or less, optionally 15 arcsec or less, optionally 10 arcsec or less.

If the threshold is further reduced (in that the angle epsilon_max is reduced), the wafer fulfills the requirements for an even more improved visual quality of the computer-generated visual information. This is because a lower threshold requires a lower value of the local quality index. This in turn can be achieved by further improving the angles of total inner reflections by way of appropriate design of the wafer, especially its main surfaces.

In one embodiment it might be optional that the local quality index LQI of the wafer is equal to or larger than 0.001 arcsec/mm, optionally equal to or larger than 0.005 arcsec/mm, optionally equal to or larger than 0.01 arcsec/mm, optionally equal to or larger than 0.05 arcsec/mm, optionally equal to or larger than 0.1 arcsec/mm, optionally equal to or larger than 0.2 arcsec/mm, optionally equal to or larger than 0.3 arcsec/mm, optionally equal to or larger than 0.4 arcsec/mm, optionally equal to or larger than 0.5 arcsec/mm, optionally equal to or larger than 0.7 arcsec/mm, optionally equal to or larger than 0.9 arcsec/mm, optionally equal to or larger than 1 arcsec/mm.

In certain applications it is, however, acceptable to have a local quality index for one or more sub-domains which is larger than zero. Allowing a larger LQI reduces costs of manufacturing of the glass wafer. In other words, although there might still be imperfections present in the wafer or the like, especially with respect to its first and/or second main surfaces, which lead to a difference between the angles of total inner reflections between initially parallel beams, this might be still not prevent from the capability of presenting computer-generated visual information of high visual quality to a person.

In one embodiment it might be optional that the glass wafer is designed, at least within the effective domain, as an optical light guide.

Said design is particularly important for glasses for AR devices.

In one embodiment it might be optional that the glass wafer, especially its first and second main surfaces, is designed such that parallel or quasi-parallel light beams which are coupled into any of the sub-domains at a feeding point of the respective sub-domain under an angle of incidence can propagate within the sub-domain along a propagation path by experiencing a plurality of total inner reflections at the first and second main surfaces until the light beams are released out of the sub-domain at an end point under an angle of release, wherein the difference between the angles of release for two or more of such light beams is (a) equal to or smaller than 120 arcsec, optionally equal to or smaller than 90 arcsec, optionally equal to or smaller than 60 arcsec, optionally equal to or smaller than 45 arcsec, optionally equal to or smaller than 30 arcsec, optionally equal to or smaller than 20 arcsec, and/or (b) equal to or larger than 0.001 arcsec, optionally equal to or larger than 0.01 arcsec, optionally equal to or larger than 0.05 arcsec, optionally equal to or larger than 0.1 arcsec, optionally equal to or larger than 0.5 arcsec.

In one embodiment it might be optional that:

(i) the light beams have a wavelength of between 587 nm and 588 nm, especially of 587.562 nm;

(ii) the light beams are coupled into the sub-domain at the feeding point by way of at least one first coupling structure, especially including at least one prism and/or at least one surface-grating; and/or (iii) the light beams are coupled out of the respective sub-domain at the end point by way of at least one second coupling structure, especially including at least one prism and/or at least one surface-grating.

In one embodiment it might be optional that the glass material of the glass wafer includes the following components in weight percent (wt.-%):

| | |
|---|---|
| $SiO_2$ | 0-30 |
| $P_2O_5$ | 0-25 |
| $B_2O_3$ | 0-20 |
| $Na_2O$ | 0-15 |
| $K_2O$ | 0-10 |
| CaO | 0-5 |
| BaO | 0-25 |
| ZnO | 0-15 |
| $La_2O_3$ | 0-50 |
| $Gd_2O_3$ | 0-10 |
| $Y_2O_3$ | 0-5 |
| $ZrO_2$ | 0-10 |
| $TiO_2$ | 0-30 |
| $Nb_2O_5$ | 0-50 |

Respective glass materials are particularly optional for the proposed glass wafer.

The present invention provides, according to a third aspect, a glass part element, which optionally is or can be a part of a glass wafer according to the second aspect of the invention, which especially is corresponding or can correspond to one of the sub-domains thereof, the glass part element having a first main surface and a second main surface opposite the first main surface, and the material of the glass part element having a refractive index N, wherein for the glass part element of maximal extension D:

from the glass part element's thickness distribution between the first and the second main surface of the glass part element, a specific angle $\varepsilon$ can be determined, wherein the specific angle $\varepsilon$ is determined as the angle of the planar contribution to the change in the thickness distribution;

wherein optionally the planar contribution is determined by the contribution of the orders 1, especially being the wedge contribution in one direction, and 2, especially being the wedge contribution in another perpendicular direction, of the expression of the thickness distribution using a least-squares-approximation with Zernike-Polynomials, wherein the orders are expressed by the indexing scheme of James C. Wyant, wherein optionally such planar contribution to the change in the thickness distribution may also be regarded as the wedge and hence the specific angle $\varepsilon$ is the slope-angle of this wedge;

wherein the glass part element has a maximal thickness of 2 mm or less, wherein the glass part element has a specific thickness t, wherein the glass part element is designed such that with respect to one or more parameters a local quality index LQI of the glass part element is equal to or smaller than a threshold T, with the threshold T being defined as $$T = \frac{\varepsilon_{max}}{D}$$

wherein $\varepsilon_{max}$ is 360 arcsec or less;

wherein the local quality index is defined as:

$$LQI = \frac{|\varepsilon|}{t}\sqrt{N^2 - 1}$$

It is a surprising finding that a glass part element, which has properties, especially optical properties such as the refractive index and/or geometric properties concerning its first and second main surfaces, which meet the condition of the local quality index, represents a glass part element which is well-suited as light guiding plates for presenting visual information of high visual quality, due to preserving the parallel arrangement of initially parallel light beams to a high degree.

The local quality index directly describes the capability of the glass part element to limit the change of the angle of the total inner reflections which are experienced by light beams propagating within the glass wafer.

As a consequence, the pixel of visual information is still of high quality, e.g. non-blurred, hence, sharp, for example at the position of some sensing way such as a person's retina.

Since these aspects have been discussed already above with respect to the first and second aspect of the present invention in detail, reference can be made to the respective parts of the description above in order to avoid unnecessary repetition here.

Said glass part elements may be employed in augmented reality devices, such as augmented reality glasses.

Said glass part elements may be employed in medical applications, aviation, automotive and/or logistics, just to name a few.

All options and optional embodiments discussed above with respect to the sub-domains (and especially where applicable also with respect to the glass wafer) apply mutatis mutandis to the glass part element, too. Therefore, it is not necessary to repeat all of the options here again.

Especially the following options applies mutatis mutandis, too, for the glass part element: The refractive index N; the maximal extension D of the sub-domain; the specific angle of the sub-domain; the thickness of the sub-domain; the specific thickness of the sub-domain; the shape of the sub-domain; the one or more parameters of the glass wafer; the maximal thickness of the sub-domain; the maximal thickness of the glass wafer; the LQI of the sub-domain; the threshold T; and/or the angle $\varepsilon_{max}$.

In one embodiment it might be optional that the specific thickness is the minimal thickness, the maximal thickness, and/or the mean thickness of the glass part element.

The minimal thickness and the maximal thickness can be determined in a reliable manner. Reference can be made to examples how to measure absolute thickness values to the description above.

In one embodiment it might be optional that the maximal extension D of the glass part element is its diameter for a disk-like glass part element and/or the maximal extension D is (i) 1 mm or more, optionally 3 mm or more, optionally 5 mm or more, optionally 10 mm or more, optionally 20 mm or more, optionally 30 mm or more, optionally 40 mm or more, optionally 50 mm or more, optionally 60 mm or more, optionally 70 mm or more, optionally 75 mm or more, (ii) 100 mm or less, optionally 90 mm or less, optionally 80 mm or less, optionally 70 mm or less, optionally 60 mm or less, optionally 50 mm or less, optionally 40 mm or less, optionally 30 mm or less, optionally 20 mm or less, optionally 10 mm or less, optionally 5 mm or less, optionally 3 mm or less, and/or (iii) between 1 mm and 100 mm, optionally between 3 mm and 90 mm, optionally between 5 mm and 80 mm, optionally between 10 mm and 70 mm, optionally between 30 mm and 70 mm, optionally between 20 mm and 60 mm, optionally between 40 mm and 60 mm, most optionally 60 mm, 50 mm, 40 mm, 30 mm or 20 mm.

A glass part element having said maximal extensions is particularly optional for augmented reality applications, especially for glasses for augmented reality.

In one embodiment it might be optional that the glass part element has in at least one cross-sectional plane, especially the cross-sectional plane being arranged between the first main surface and the second main surface, a circular, an oval or a rectangular circumferential shape, especially with rounded edges.

A glass part element having said shapes is particularly optional for augmented reality applications, especially for glasses for augmented reality.

The present invention provides, according to a fourth aspect, a stack including two or more glass part elements according to the third aspect of the invention.

The proposed stack allows for providing computer-generated visual information of high visual quality also for multi-color scenarios. For example, a first glass part element can be used for providing the parts of the visual information including green color, while a second glass part element can be used for providing the parts of the visual information including red color.

Said stack may be employed in augmented reality devices, such as augmented reality glasses.

Said stack may be employed in medical applications, aviation, automotive and/or logistics, just to name a few.

In one embodiment it might be optional that:
(a) all glass part elements are provided, especially arranged and/or orientated, such that within the stack the wedges of the individual glass part elements are oriented in the same or quasi-same manner;
(b) the glass part elements are stacked vertically;
(c) at least two of the glass part elements, optionally all glass part elements included by the stack, are provided such that the angle $\varepsilon_{max}$ is 300 arcsec or less, optionally 240 arcsec or less, optionally 180 arcsec or less, optionally 120 arcsec or less, optionally 90 arcsec or less, optionally 60 arcsec or less, optionally 45 arcsec or less, optionally 30 arcsec or less, optionally 20 arcsec or less, optionally 15 arcsec or less, optionally 10 arcsec or less, optionally 5 arcsec or less; and/or
(d) at least two of the glass part elements are provided, especially arranged and/or orientated, such that within the stack the wedges of these glass part elements are oriented opposed, and especially the angle $\varepsilon_{max}$ for at least these glass part elements, optionally for all glass part elements included by the stack, is 300 arcsec or less, optionally 240 arcsec or less, optionally 180 arcsec or less, optionally 120 arcsec or less, optionally 90 arcsec or less, optionally 60 arcsec or less, optionally 45 arcsec or less, optionally 30 arcsec or less, optionally 20 arcsec or less, optionally 15 arcsec or less, optionally 10 arcsec or less, optionally 5 arcsec or less.

It surprisingly turned out that the visual quality of the visual information can be further improved, if the difference between the angle of releases of pairs of glass part elements—especially of each pair of glass part elements—is restricted within said boundaries.

In one embodiment it is optional that the light beam propagating along a first specific propagation path within a first glass part element of the stack and the light beam propagating along a second specific propagation path within a second glass part element of the stack have an identical angle of incident when coupled into the respective glass part element. In other words, the angle enclosed between the respective light beam and the respective glass part element is for both light beams the same. Optionally, for such light beams the difference between the angles of release of any two light beams leaving the stack is smaller than a critical value of 360/D arcsec (with D being the maximal extension of the glass part element).

The present invention provides, according to a fifth aspect, an augmented reality device, especially glasses of such a device, including
(i) at least one glass wafer, or at least one part thereof, according to the second aspect of the present invention;
(ii) at least one glass part element according to the third aspect of the present invention.
and/or
(iii) at least one stack according to the fourth aspect of the present invention Such an augmented reality device takes advantage from all advantages described above with respect to the first, second, third and fourth aspects of the present invention. Therefore, in order to avoid repetition, reference can be made to the respective parts of the description.

Said augmented reality device may be or include glasses for augmented reality.

Said augmented reality device may be employed in medical applications, aviation, automotive and/or logistics, just to name a few.

The present invention provides, according to a sixth aspect, a use of:
(i) a glass wafer, or at least one part thereof, according to the second aspect of the invention;
(ii) a glass part element according to the third aspect of the invention; and/or
(iii) a stack according to the fourth aspect of the invention, in an augmented reality device, especially for glasses for augmented reality.

Such a use takes advantage from all advantages described above with respect to the first, second, third and fourth aspects of the present invention. Therefore, in order to avoid repetition, reference can be made to the respective parts of the description.

Optionally, fields of use are: medical applications, aviation, automotive and/or logistics, just to name a few.
Additional Optional Aspects In the following, further optional features of the glass wafer according to the second aspect of the invention and of the glass part element according to the third aspect of the invention are presented.

To make the description easier to read, the features are described with respect to "the article (of the invention)". It is clear, that "the article" here is used as placeholder and that each feature may be an optional feature of the glass wafer and/or of the glass part element.

In this regard "the article of the invention includes X" means "the glass wafer includes X", "the glass part element includes X" or "the glass wafer includes X and the glass part element includes X".

Optionally, the article of the invention has a thickness t, especially the thickness being a mean thickness of the article. Optionally, the thickness t of the article is in a range of from 0.10 mm to 2.0 mm, optionally from 0.15 mm to 1.5 mm, optionally from 0.20 mm to 1.2 mm, optionally from 0.25 mm to 1.0 mm, optionally from 0.30 mm to 0.70 mm, for example from 0.40 mm to 0.60 mm. Optionally the thickness t of the article can be less than 1 mm, optionally less than 0.5 mm, optionally less than 0.2 mm. Optionally the thickness t is more than 0.1 mm.

Optionally, the article of the invention is a glass wafer, in particular a planar glass wafer such as a planar waveguide. Optionally, the article has two main surfaces. Optionally, the main surfaces have about the same surface area. Optionally, each main surface has a surface area in the range of from 1,000 to 1,000,000 mm$^2$, optionally, from 3,000 to 750,000 mm$^2$, optionally from 5,000 to 500,000 mm$^2$, for example from 10,000 to 400,000 mm$^2$, from 20,000 to 300,000 mm$^2$, from 30,000 to 200,000 mm$^2$, from 40,000 to 150,000 mm$^2$, from 50,000 to 125,000 mm$^2$, or from 60,000 to 100,000 mm$^2$.

Optionally, the glass of the article of the invention has a Knoop hardness $H_k$ in a range of from 2 GPa to 10 GPa, optionally, from 2.5 GPa to 9.5 GPa, optionally from 3 GPa to 9 GPa, optionally from 3.5 GPa to 8.5 GPa, optionally from 4 to 8 GPa. The Knoop hardness $H_k$ is a measure for permanent surface alterations upon indentation with a diamond indenter. The Knoop hardness $H_k$ is optionally determined according to ISO 9385. Optionally, the Knoop hardness $H_k$ is determined for an indentation force of 0.9807 N (i.e. 0.1 kp) and indentation time of 20 seconds. Optionally, the Knoop hardness $H_k$ is determined using polished glass surfaces at room temperature.

Optionally, the glasses of the invention have a Young's modulus in the range of from 60 to 160 GPa, for example from 70 to 150 GPa or from 80 to 140 GPa.

Optionally, the refractive index N of the glass of the article at a wavelength of 450 nm is in a range of from 1.45 to 2.45, optionally from 1.50 to 2.40, optionally from 1.55 to 2.35, optionally from 1.60 to 2.30, optionally from 1.65 to 2.25, optionally from 1.70 to 2.20, for example from 1.75 to 2.15, from 1.80 to 2.10, from 1.85 to 2.05, from 1.86 to 2.04, from 1.87 to 2.03, from 1.88 to 2.02, from 1.89 to 2.01, or from 1.90 to 2.00. Particularly optionally, the refractive index n of the glass at a wavelength of 450 nm is in a range of from 1.70 to 2.00.

Optionally, the article of the invention is a glass wafer. The article may be a rectangular-shaped glass wafer, for example having a length in a range of from 40 mm to 1,250 mm and a width of from 30 mm to 750 mm. However, optionally the article is not rectangular-shaped but round-shaped, in particular a round-shaped glass wafer. A round-shaped glass wafer may also be described as disc-like glass wafer. Optionally, the article is a disc-like glass wafer, optionally a glass article having a diameter in the range of from 100 mm to 500 mm, optionally from 120 mm to 450 mm, optionally from 140 mm to 400 mm, optionally from 160 mm to 350 mm, optionally from 180 mm to 325 mm, optionally from 200 mm to 300 mm. A diameter of about 200 mm or about 300 mm is particularly optional. Optionally, the diameter of the article is at least 100 mm, at least 120 mm, at least 140 mm, at least 160 mm, at least 180 mm or at least 200 mm. Optionally, the diameter of the article is at most 500 mm, optionally at most 450 mm, optionally at most 400 mm, optionally at most 350 mm, optionally at most 325 mm, optionally at most 300 mm.

Optionally, the article of the invention is a glass wafer, in particular a planar glass wafer such as a planar waveguide.

Optionally, the article of the invention is a part of a glass wafers, in particular of a planar glass wafer such as a planar waveguide.

Optionally, the article of the invention has a low warp, in particular a warp of less than 100 μm, optionally of less than 50 μm, optionally less than 20 μm. The warp may be more than 1 μm, more than 5 μm or more than 10 μm. Optionally, the article of the invention has a low bow, in particular a bow of less than 100 μm, optionally less than 50 μm, optionally less than 20 μm. The bow may be more than 1 μm, more than 5 μm or more than 10 μm. Warp and/or bow of the article may be influenced by diameter and thickness of the article as well as by coatings. Optionally, warp and/or bow of the article of the invention is less than 0.1% of the article diameter, optionally less than 0.075% of the article diameter, optionally less than 0.05% of the article diameter, optionally less than 0.025% of the article diameter, optionally less than 0.01% of the article diameter. Warp and/or bow may be more than 0.001% of the article diameter, more than 0.002% of the article diameter or more than 0.005% of the article diameter. Optionally, warp and bow are determined according to SEMI3D1203152015.

Optionally, the TTV (Total Thickness Variation) of the article is smaller than 2 μm, optional smaller than 1.8 μm, optional smaller than 1.6 μm, optional smaller than 1.5 μm, optional smaller than 1.4 μm, optional smaller than 1.3 μm, optional smaller than 1.2 μm, optional smaller than 1.1 μm, optional smaller than 1.0 μm, optional smaller than 0.75 μm, optional smaller than 0.5 μm. TTV may be determined based on SEMI MF 1530GBIR. TTV may also be determined based on interferometric measurements of the thickness profile of the article, for example using an interferometer, in particular an interferometer of Zygo Corporation. In some embodiments, TTV may be at least 0.1 μm or at least 0.2 μm. A very low TTV is particularly advantageous for use of the article in the AR field. A low TTV may for example be obtained by abrasive processes such as grinding, lapping and/or polishing. Thus, the article of the invention is optionally an article that an abrasive process has been applied to.

Optionally, the article of the invention has a surface roughness $R_q$ in a range of from 0.1 nm to 5 nm, for example from 0.15 nm to 3.5 nm, from 0.2 nm to 2 nm, from 0.25 nm to 1.5 nm, from 0.3 nm to 1.0 nm, or from 0.35 nm to 0.75 nm. Optionally, the surface roughness $R_q$ is less than 5 nm, optionally less than 3.5 nm, optionally less than 2 nm, optionally less than 1.5 nm, optionally less than 1.0 nm, optionally less than 0.75 nm, optionally less than 0.5 nm. Surface roughness $R_q$ is optionally determined with white light interferometry (WLI) or atomic force microscopy (AFM). AFM is most optional. In the present disclosure, the terms "$R_q$" and "RMS" are used interchangeably. Surface roughness $R_q$ is optionally determined according to DIN EN ISO 4287.

Optionally, the article of the invention has a surface roughness $R_a$ in a range of from 0.1 nm to 5 nm, for example from 0.15 nm to 3.5 nm, from 0.2 nm to 2 nm, from 0.25 nm to 1.5 nm, from 0.3 nm to 1.0 nm, or from 0.35 nm to 0.75 nm. Optionally, the surface roughness $R_a$ is less than 5 nm, optionally less than 3.5 nm, optionally less than 2 nm, optionally less than 1.5 nm, optionally less than 1.0 nm, optionally less than 0.75 nm, optionally less than 0.5 nm. Surface roughness $R_a$ is optionally determined according to ISO DIN EN ISO 4287.

The glass material of the article of the invention is not restricted to particular glass compositions. Exemplary composition ranges are presented in the following as mere examples.

The amount of $SiO_2$ in the glass material of the article of the invention may optionally be in a range of from 0 to 80 wt.-%, for example at most 70 wt.-%, at most 60 wt.-% or at most 15 wt.-%. In some embodiments, the amount of $SiO_2$ is at least 10 wt.-%, at least 20 wt.-%, at least 30 wt.-% or at least 40 wt.-%. In other embodiments, the amount of $SiO_2$ is less than 20 wt.-% or even less than 10 wt.-%.

The amount of $P_2O_5$ in the glass material of the article of the invention may optionally be in a range of from 0 to 40 wt.-%, for example at most 30 wt.-%, at most 5 wt.-% or at most 2 wt.-%. In some embodiments, the amount of $P_2O_5$ may be at least 10 wt.-%, at least 15 wt.-% or at least 20 wt.-%. In other embodiments, the amount of $P_2O_5$ is at most 1 wt.-%, or at most 0.5 wt.-%. The glass material of the article of the invention may also be free of $P_2O_5$.

The amount of $Al_2O_3$ in the glass material of the article of the invention may optionally be in a range of from 0 to 25 wt.-%, for example at most 15 wt.-%, at most 10 wt.-%, or at most 5 wt.-%. In some embodiments, the amount of $Al_2O_3$ may be at least 0.1 wt.-%, at least 0.5 wt.-% or at least 1 wt.-%. In some embodiments, the amount of $Al_2O_3$ is at most 1 wt.-% or at most 0.5 wt.-%. The glass material of the article of the invention may also be free of $Al_2O_3$.

The amount of $B_2O_3$ in the glass material of the article of the invention may optionally be in a range of from 0 to 55 wt.-%, for example at most 45 wt.-%, at most 35 wt.-%, or at most 25 wt.-%. In some embodiments, the amount of $B_2O_3$ may be at least 1 wt.-%, at least 2 wt.-%, or at least 5 wt.-%. In some embodiments, the amount of $B_2O_3$ is at most 20 wt.-%, at most 15 wt.-% or at most 10 wt.-%. The glass material of the article of the invention may also be free of $B_2O_3$.

The amount of $Li_2O$ in the glass material of the article of the invention may optionally be in a range of from 0 to 10 wt.-%, for example at most 5 wt.-%, at most 2 wt.-%, or at most 1 wt.-%. In some embodiments, the amount of $Li_2O$ may be at least 0.5 wt.-%, at least 1 wt.-%, or at least 2 wt.-%. In other embodiments, the amount of $Li_2O$ is at most 0.5 wt.-%, at most 0.2 wt.-% or at most 0.1 wt.-%. The glass material of the article of the invention may also be free of $Li_2O$.

The amount of $Na_2O$ in the glass material of the article of the invention may optionally be in a range of from 0 to 30 wt.-%, for example at most 25 wt.-%, at most 20 wt.-%, at most 10 wt.-%, or at most 5 wt.-%. In some embodiments, the amount of $Na_2O$ may be at least 1 wt.-%, at least 2 wt.-%, or at least 5 wt.-%. In some embodiments, the amount of $Na_2O$ is at most 2 wt.-%, at most 1 wt.-% or at most 0.5 wt.-%. The glass material of the article of the invention may also be free of $Na_2O$.

The amount of $K_2O$ in the glass material of the article of the invention may optionally be in a range of from 0 to 25 wt.-%, for example at most 20 wt.-%, at most 10 wt.-%, or at most 5 wt.-%. In some embodiments, the amount of $K_2O$ may be at least 1 wt.-%, at least 2 wt.-%, or at least 5 wt.-%. In some embodiments, the amount of $K_2O$ is at most 2 wt.-%, at most 1 wt.-% or at most 0.5 wt.-%. The glass material of the article of the invention may also be free of $K_2O$.

The amount of MgO in the glass material of the article of the invention may optionally be in a range of from 0 to 10 wt.-%, for example at most 5 wt.-%, at most 2 wt.-%, or at most 1 wt.-%. In some embodiments, the amount of MgO may be at least 0.5 wt.-%, at least 1 wt.-%, or at least 2 wt.-%. In other embodiments, the amount of MgO is at most 0.5 wt.-%, at most 0.2 wt.-% or at most 0.1 wt.-%. The glass material of the article of the invention may also be free of MgO.

The amount of CaO in the glass material of the article of the invention may optionally be in a range of from 0 to 40 wt.-%, for example at most 30 wt.-%, at most 25 wt.-%, or at most 15 wt.-%. In some embodiments, the amount of CaO may be at least 1 wt.-%, at least 5 wt.-%, or at least 10 wt.-%. In some embodiments, the amount of CaO is at most 10 wt.-%, at most 5 wt.-%, or at most 1 wt.-%. The glass material of the article of the invention may also be free of CaO.

The amount of SrO in the glass material of the article of the invention may optionally be in a range of from 0 to 25 wt.-%, for example at most 15 wt.-%, at most 10 wt.-%, or at most 5 wt.-%. In some embodiments, the amount of SrO may be at least 0.5 wt.-%, at least 1 wt.-%, or at least 2 wt.-%. In some embodiments, the amount of SrO is at most 2 wt.-%, at most 1 wt.-%, or at most 0.5 wt.-%. The glass material of the article of the invention may also be free of SrO.

The amount of BaO in the glass material of the article of the invention may optionally be in a range of from 0 to 55 wt.-%, for example at most 30 wt.-%, at most 20 wt.-%, or at most 10 wt.-%. In some embodiments, the amount of BaO may be at least 1 wt.-%, at least 5 wt.-%, or at least 10 wt.-%. In some embodiments, the amount of BaO is at most 5 wt.-%, at most 2 wt.-%, or at most 1 wt.-%. The glass material of the article of the invention may also be free of BaO.

The amount of ZnO in the glass material of the article of the invention may optionally be in a range of from 0 to 30 wt.-%, for example at most 20 wt.-%, at most 15 wt.-%, or at most 10 wt.-%. In some embodiments, the amount of ZnO may be at least 1 wt.-%, at least 2 wt.-%, or at least 5 wt.-%. In some embodiments, the amount of ZnO is at most 5 wt.-%, at most 2 wt.-%, or at most 1 wt.-%. The glass material of the article of the invention may also be free of ZnO.

The amount of $La_2O_3$ in the glass material of the article of the invention may optionally be in a range of from 0 to 55 wt.-%, for example at most 50 wt.-%, at most 40 wt.-%, or at most 20 wt.-%. In some embodiments, the amount of $La_2O_3$ may be at least 5 wt.-%, at least 10 wt.-%, or at least 20 wt.-%. In some embodiments, the amount of $La_2O_3$ is at most 10 wt.-%, at most 5 wt.-%, or at most 1 wt.-%. The glass material of the article of the invention may also be free of $La_2O_3$.

The amount of $Gd_2O_3$ in the glass material of the article of the invention may optionally be in a range of from 0 to 20 wt.-%, for example at most 15 wt.-%, at most 10 wt.-%, or at most 5 wt.-%. In some embodiments, the amount of $Gd_2O_3$ may be at least 1 wt.-%, at least 2 wt.-%, or at least 5 wt.-%. In some embodiments, the amount of $Gd_2O_3$ is at most 5 wt.-%, at most 2 wt.-%, or at most 1 wt.-%. The glass material of the article of the invention may also be free of $Gd_2O_3$.

The amount of $Y_2O_3$ in the glass material of the article of the invention may optionally be in a range of from 0 to 20 wt.-%, for example at most 15 wt.-%, at most 10 wt.-%, or at most 5 wt.-%. In some embodiments, the amount of $Y_2O_3$ may be at least 0.1 wt.-%, at least 0.2 wt.-%, or at least 0.5 wt.-%. In some embodiments, the amount of $Y_2O_3$ is at most 2 wt.-%, at most 1 wt.-%, or at most 0.5 wt.-%. The glass material of the article of the invention may also be free of $Y_2O_3$.

The amount of $ZrO_2$ in the glass material of the article of the invention may optionally be in a range of from 0 to 20 wt.-%, for example at most 15 wt.-%, at most 10 wt.-%, or at most 5 wt.-%. In some embodiments, the amount of $ZrO_2$ may be at least 1 wt.-%, at least 2 wt.-%, or at least 5 wt.-%. In some embodiments, the amount of $ZrO_2$ is at most 7.5 wt.-%, at most 5 wt.-%, or at most 2.5 wt.-%. The glass material of the article of the invention may also be free of $ZrO_2$.

The amount of $TiO_2$ in the glass material of the article of the invention may optionally be in a range of from 0 to 35 wt.-%, for example at most 30 wt.-%, at most 20 wt.-%, or at most 15 wt.-%. In some embodiments, the amount of $TiO_2$ may be at least 2 wt.-%, at least 5 wt.-%, or at least 10 wt.-%. In some embodiments, the amount of $TiO_2$ is at most 10 wt.-%, at most 7.5 wt.-%, or at most 5 wt.-%. The glass material of the article of the invention may also be free of $TiO_2$.

The amount of $Ta_2O_5$ in the glass material of the article of the invention may optionally be in a range of from 0 to 30 wt.-%, for example at most 25 wt.-%, at most 17.5 wt.-%, or at most 10 wt.-%. In some embodiments, the amount of $Ta_2O_5$ may be at least 1 wt.-%, at least 2 wt.-%, or at least 5 wt.-%. In some embodiments, the amount of $Ta_2O_5$ is at most 5 wt.-%, at most 2 wt.-%, or at most 1 wt.-%. The glass material of the article of the invention may also be free of $Ta_2O_5$.

The amount of $Nb_2O_5$ in the glass material of the article of the invention may optionally be in a range of from 0 to 55 wt.-%, for example at most 35 wt.-%, at most 20 wt.-%, or at most 15 wt.-%. In some embodiments, the amount of $Nb_2O_5$ may be at least 2 wt.-%, at least 5 wt.-%, or at least 10 wt.-%. In some embodiments, the amount of $Nb_2O_5$ is at most 10 wt.-%, at most 5 wt.-%, or at most 2 wt.-%. The glass material of the article of the invention may also be free of $Nb_2O_5$.

The amount of $WO_3$ in the glass material of the article of the invention may optionally be in a range of from 0 to 10 wt.-%, for example at most 7.5 wt.-%, at most 5 wt.-%, or at most 2 wt.-%. In some embodiments, the amount of $WO_3$ may be at least 0.1 wt.-%, at least 0.2 wt.-%, or at least 0.5 wt.-%. In some embodiments, the amount of $WO_3$ is at most 1 wt.-%, at most 0.5 wt.-%, or at most 0.2 wt.-%. The glass material of the article of the invention may also be free of $WO_3$.

The amount of $Bi_2O_3$ in the glass material of the article of the invention may optionally be in a range of from 0 to 65 wt.-%, for example at most 50 wt.-%, at most 20 wt.-%, or at most 10 wt.-%. In some embodiments, the amount of $Bi_2O_3$ may be at least 1 wt.-%, at least 2 wt.-%, or at least 5 wt.-%. In some embodiments, the amount of $Bi_2O_3$ is at most 5 wt.-%, at most 1 wt.-%, or at most 0.1 wt.-%. The glass material of the article of the invention are optionally free of $Bi_2O_3$.

The amount of F in the glass material of the article of the invention may optionally be in a range of from 0 to 45 wt.-%, for example at most 25 wt.-%, at most 10 wt.-%, or at most 5 wt.-%. In some embodiments, the amount of F may be at least 0.1 wt.-%, at least 0.5 wt.-%, or at least 1 wt.-%. In some embodiments, the amount of F is at most 2 wt.-%, at most 1 wt.-%, or at most 0.1 wt.-%. The glass material of the article of the invention are optionally free of F.

The amount of $GeO_2$ in the glass material of the article of the invention may optionally be in a range of from 0 to 20 wt.-%, for example at most 15 wt.-%, at most 10 wt.-%, or at most 5 wt.-%. In some embodiments, the amount of $GeO_2$ may be at least 0.1 wt.-%, at least 0.5 wt.-%, or at least 1 wt.-%. In some embodiments, the amount of $GeO_2$ is at most 2 wt.-%, at most 1 wt.-%, or at most 0.1 wt.-%. The glass material of the article of the invention are optionally free of $GeO_2$.

The amount of PbO in the glass material of the article of the invention may optionally be in a range of from 0 to 80 wt.-%, for example at most 70 wt.-%, at most 50 wt.-%, or at most 20 wt.-%. In some embodiments, the amount of PbO may be at least 1 wt.-%, at least 2 wt.-%, or at least 5 wt.-%. In some embodiments, the amount of PbO is at most 5 wt.-%, at most 1 wt.-%, or at most 0.1 wt.-%. The glass material of the article of the invention are optionally free of PbO in particular in view of the toxicity and environmental unfriendliness thereof.

Optionally, the glass material of the article of the invention includes (or essentially consists of) the following components in the indicated ranges (in wt.-%):

| Component | Amount (wt.-%) |
| --- | --- |
| $SiO_2$ | 0-80 |
| $P_2O_5$ | 0-40 |
| $Al_2O_3$ | 0-25 |
| $B_2O_3$ | 0-55 |
| $Li_2O$ | 0-10 |
| $Na_2O$ | 0-25 |
| $K_2O$ | 0-25 |
| MgO | 0-10 |
| CaO | 0-30 |
| SrO | 0-25 |
| BaO | 0-55 |
| ZnO | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |
| $Nb_2O_5$ | 0-55 |
| $WO_3$ | 0-10 |
| $GeO_2$ | 0-20 |
| $Bi_2O_3$ | 0-65 |
| PbO | 0-80 |
| F | 0-45. |

More optionally, the glass material of the article of the invention includes (or essentially consists of) the following components in the indicated ranges (in wt.-%):

| Component | Amount (wt.-%) |
| --- | --- |
| $SiO_2$ | 0-80 |
| $P_2O_5$ | 0-30 |
| $Al_2O_3$ | 0-15 |
| $B_2O_3$ | 0-55 |
| $Li_2O$ | 0-10 |
| $Na_2O$ | 0-25 |
| $K_2O$ | 0-25 |
| MgO | 0-5 |
| CaO | 0-30 |
| SrO | 0-10 |
| BaO | 0-55 |
| ZnO | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |
| $Nb_2O_5$ | 0-55 |
| $WO_3$ | 0-10 |
| $GeO_2$ | essentially free of |
| $Bi_2O_3$ | essentially free of |
| PbO | 0-70 |
| F | 0-25. |

More optionally, the glass material of the article of the invention includes (or essentially consists of) the following components in the indicated ranges (in wt.-%):

| Component | Amount (wt.-%) |
|---|---|
| $SiO_2$ | 0-80 |
| $P_2O_5$ | 0-5 |
| $Al_2O_3$ | 0-10 |
| $B_2O_3$ | 0-45 |
| $Li_2O$ | 0-10 |
| $Na_2O$ | 0-20 |
| $K_2O$ | 0-20 |
| $MgO$ | 0-5 |
| $CaO$ | 0-30 |
| $SrO$ | 0-10 |
| $BaO$ | 0-55 |
| $ZnO$ | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |
| $Nb_2O_5$ | 0-35 |
| $WO_3$ | 0-10 |
| $GeO_2$ | essentially free of |
| $Bi_2O_3$ | essentially free of |
| $PbO$ | essentially free of |
| F | 0-5. |

More optionally, the glass material of the article of the invention includes (or essentially consists of) the following components in the indicated ranges (in wt.-%):

| Component | Amount (wt.-%) |
|---|---|
| $SiO_2$ | 0-60 |
| $P_2O_5$ | 0-2 |
| $Al_2O_3$ | 0-5 |
| $B_2O_3$ | 0-45 |
| $Li_2O$ | 0-10 |
| $Na_2O$ | 0-10 |
| $K_2O$ | 0-10 |
| $MgO$ | 0-5 |
| $CaO$ | 0-30 |
| $SrO$ | 0-10 |
| $BaO$ | 0-30 |
| $ZnO$ | 0-30 |
| $La_2O_3$ | 0-55 |
| $Gd_2O_3$ | 0-20 |
| $Y_2O_3$ | 0-20 |
| $ZrO_2$ | 0-15 |
| $TiO_2$ | 0-20 |
| $Ta_2O_5$ | 0-25 |
| $Nb_2O_5$ | 0-20 |
| $WO_3$ | 0-5 |
| $GeO_2$ | essentially free of |
| $Bi_2O_3$ | essentially free of |
| $PbO$ | essentially free of |
| F | essentially free of. |

More optionally, the glass material of the article of the invention includes (or essentially consists of) the following components in the indicated ranges (in wt.-%):

| Component | Amount (wt.-%) |
|---|---|
| $SiO_2$ | 0-15 |
| $P_2O_5$ | essentially free of |
| $Al_2O_3$ | essentially free of |
| $B_2O_3$ | 0-45 |
| $Li_2O$ | essentially free of |
| $Na_2O$ | essentially free of |
| $K_2O$ | essentially free of |
| $MgO$ | essentially free of |
| $CaO$ | 0-15 |
| $SrO$ | 0-5 |
| $BaO$ | 0-10 |

-continued

| Component | Amount (wt.-%) |
|---|---|
| $ZnO$ | 0-30 |
| $La_2O_3$ | 0-55 |
| $Gd_2O_3$ | 0-20 |
| $Y_2O_3$ | 0-20 |
| $ZrO_2$ | 0-10 |
| $TiO_2$ | 0-15 |
| $Ta_2O_5$ | 0-10 |
| $Nb_2O_5$ | 0-15 |
| $WO_3$ | 0-5 |
| $GeO_2$ | essentially free of |
| $Bi_2O_3$ | essentially free of |
| $PbO$ | essentially free of |
| F | essentially free of. |

Also optionally, the glass material of the article of the invention includes (or essentially consists of) the following components in the indicated ranges (in wt.-%):

| Component | Amount (wt.-%) |
|---|---|
| $SiO_2$ | 0-30 |
| $P_2O_5$ | 0-25 |
| $B_2O_3$ | 0-20 |
| $Na_2O$ | 0-15 |
| $K_2O$ | 0-10 |
| $CaO$ | 0-5 |
| $BaO$ | 0-25 |
| $ZnO$ | 0-15 |
| $La_2O_3$ | 0-50 |
| $Gd_2O_3$ | 0-10 |
| $Y_2O_3$ | 0-5 |
| $ZrO_2$ | 0-10 |
| $TiO_2$ | 0-30 |
| $Nb_2O_5$ | 0-50. |

Also optionally, the glass material of the article of the invention includes (or essentially consists of) the following components in the indicated ranges (in wt.-%):

| Component | Amount (wt.-%) |
|---|---|
| $SiO_2$ | 1-30 |
| $B_2O_3$ | 0-20 |
| $Na_2O$ | 0-10 |
| $K_2O$ | 0-10 |
| $CaO$ | 0-5 |
| $BaO$ | 0-20 |
| $ZnO$ | 0-15 |
| $La_2O_3$ | 10-50 |
| $Gd_2O_3$ | 0-10 |
| $Y_2O_3$ | 0-1 |
| $ZrO_2$ | 0-10 |
| $TiO_2$ | 8-30 |
| $Nb_2O_5$ | 0-35. |

Optionally, the article can have a size of at least 100 mm$^2$, at least 200 mm$^2$, at least 400 mm$^2$, at least 600 mm$^2$, at least 800 mm$^2$, at least 2000 mm$^2$ (especially diameter 2 inches (about 50 mm)), at least 4400 mm$^2$ (especially diameter 3 inches (about 75 mm)), and/or at least 74000 mm$^2$ (especially diameter 12 inches (about 300 mm)). A variety of parts can be made from such a large article, for example by sawing (dicing) parts out of the article. Larger or even smaller sheets or wafers than specified above can also be used. The article can have a round or square base.

In an optional embodiment, the article has a size of at least 100 mm$^2$, for example at least 200 mm$^2$, at least 400 mm$^2$, at least 600 mm$^2$, at least 800 mm$^2$, at least 2000 mm$^2$ (in particular diameter 2 inches (about 50 mm)), at least 4400 mm$^2$ (in particular diameter 3 inches (about 75 mm)) and/or at least 74000 mm$^2$ (in particular diameter 12 inches (about 300 mm)) wherein the article has at least 30 surface sections of 2×2 mm$^2$ size, in particular at least 40 or at least 45 surface sections. Such an article is suitable for particularly economical manufacture of components for AR applications.

The "size" of the article may optionally be the area of one of the two main sides of the article. In particular, both main sides of the article may have the same area.

Alternative Method for Manufacturing a Glass Wafer

As an alternative to the method according to the first aspect of the present invention, the inventors found that surprisingly also the following method allows for manufacturing a glass wafer for augmented reality applications from a raw wafer. In this respect the following is proposed:

A method for manufacturing a glass wafer for augmented reality applications from a raw wafer, the method including:

Providing a raw wafer, especially melting glass and obtaining a solid glass strip from the molten glass; annealing the glass strip; cutting the glass strip into one or more glass blocks; gluing two or more glass blocks together in order to obtain a glass batch; wire-sawing the glass batch in order to manufacture thin substrates close to the final thickness of the proposed glass wafer, for example deviating 10 μm or less, optionally 5 μm or less, from the final thickness, and/or in order to saw multiple glass blocks simultaneously; and/or cutting the raw wafer out of the glass batch;

Edge-grinding of the raw wafer;

Lapping the raw wafer;

Rough polishing the raw wafer; and

Fine polishing the raw wafer to obtain an intermediate wafer.

The following parameters are optional:

(i) the glass strip size is 640×210×25 mm$^3$;

(ii) the block size is 205×205×22 mm$^3$;

(iii) Wire-sawing is carried out having a wire-speed of 30 m/min, having a feed of 15 to 20 mm/h, having a SiC density of 1.1 to 1.3 g/cm$^3$ and/or having a tilt angle between the wire and the glass of 3 to 5 degrees;

(iv) Cutting the raw wafer is carried out so that the maximal extension of the raw glass wafer, optionally its diameter, is between 180 mm and 220 mm, especially between 190 mm and 210 mm, especially 201 mm, having a pressure of 0.1 to 0.2 MPa and/or having a speed of 1 m/min;

(v) Edge-grinding is carried out by having a chamfer size of between 0.05 to 0.25, having a number of cycles of 2 to 5, having a feed of between 500 to 1000 mm/min and/or having a turning speed of the tool of 20000 to 40000 rpm;

(vi) Lapping is carried out by having a removal of between 150 to 400 μm, having a pressure of between 800 N to 2000 N, having a rotational speed of between 10 to 25 rpm and/or having a slurry density of between 1.08 to 1.3 g/cm$^3$;

(vii) Rough polishing is carried out by having a removal of between 25 to 45 μm, having a pressure of between 800 N to 2000 N, having a rotational speed of between 10 to 25 rpm and/or having a slurry density of between 1.08 to 1.3 g/cm$^3$; and/or (viii) Fine polishing is carried out by having a removal of between 1 to 5 μm, having a pressure of between 400

N to 1000 N, having a rotational speed of between 10 to 25 rpm and/or having a slurry density of between 1.08 to 1.3 g/cm$^3$.

However, the person skilled in the art understands that the parameters may also be adapted dependent on the actual glass material of the glass wafer.

General Aspects Concerning the Manufacturing

Glass wafers of the present invention may be manufactured, for example, particularly in whole or in part, by drawing processes. Exemplary drawing processes include down draw, overflow fusion and redraw.

Depending on the surface quality, post-processing may be required. Exemplary post-processing steps are polishing, grinding and lapping. Grinding and optionally subsequent polishing are particularly advantageous. Grinding with bonded grit, in particular with a diamond abrasive, is particularly optional.

Optionally, drawing processes are used to obtain glass articles, such as glass wafers in particular, which already have a very good near-surface damage level. Glass articles that are not produced by drawing processes, but by casting processes as ingots and subsequently sawn and polished, may also have a very good near-surface damage level.

In one embodiment, the proposed method is or includes a down draw process, an overflow fusion process, and/or a redraw process.

Aspects Concerning the Influence of the Wafer Thickness Distribution to the LQI

It has been found that there may be different contributions present for the optional wafers, such as wafers manufactured with the method according to the first aspect of the invention and/or wafers according to the second aspect of the invention, as well as parts thereof, such as glass part elements according to the third aspect of the invention, which may be of particular interest. This is because said different contributions may affect the local wedge of the glass wafer or glass part element. The local wedge in turn affects the change of the angle of total inner reflections. Thus, controlling the contribution may allow control of the local quality index of the sub-domains of the proposed wafer and of the proposed glass part element.

One contribution may be the global wedge $H_w$, with $H_w > 0$. The global wedge is an inclination between the two main surfaces present across the entire wafer and can optionally be determined by determining the contributions of the orders j=1 and j=2 of the wafer's thickness distribution according to the method of approximation with Zernike-Polynomials as described earlier. It has been found that optional wafers and glass part elements have a reduced contribution of the global wedge $|H_w|$. If the global wedge is reduced, i.e. the value of $|H_w|$ goes towards zero, the local quality index can be met for a plurality of the sub-domains or the glass part element in a reliable manner. Hence, controlling the value of the global wedge $H_w$ allows manufacturing and characterizing of the proposed wafers and glass part elements.

Thus, in one embodiment, manufacturing a wafer or glass part element according to the invention may include controlling the global wedge $|H_w|$ of the glass wafer.

Thus, in one embodiment, a wafer or glass part element according to the invention may include a low global wedge $|H_w|$.

Another contribution may be the global Dome or Bowl $H_d$, with $H_d > 0$ being a Dome and $H_d < 0$ being a Bowl. A Dome describes an article that has a thickness that's larger in the center than on positions further radially outwards. A Bowl describes the opposite case, i.e. the center region being thinner than the radially outside positions. Also here, Bowl and Dome can be optionally determined by approximating the wafer's thickness distribution with above explained Zernike-Polynomials, while Bow and Dome will be associated with the contribution of the order j=3.

It has been found that optional wafers and glass part elements have a reduced contribution of the global Dome/Bowl $|H_d|$. It is, thus, a surprising finding that a wafer which has a reduced contribution of the global Dome/Bowl, i.e. the absolute value $|H_d|$ goes towards zero, can meet the local quality index for a plurality of sub-domains in a reliable manner. Accordingly, a glass part element with a reduced absolute value $|H_d|$ also meets the local quality index in a reliable manner. Hence, controlling the value of the Dome/Bowl $|H_d|$ allows manufacturing and characterizing of the proposed wafers and glass part elements.

Thus, in one embodiment, manufacturing a wafer or glass part element according to the invention may include controlling the global Dome/Bowl $|H_d|$ of the glass wafer.

Thus, in one embodiment, a wafer or glass part element according to the invention may include a low absolute value of the global Dome/Bowl $|H_d|$.

Optionally, $H_d$ and/or $H_w$ can be determined with the help of the Software program ZYGO MX, Version 7, or MetroPro from supplier AMETEK.

As will become apparent from the following Examples, the absolute values of $H_d$ and $H_w$ are optionally limited.

EXAMPLES

For example, the local wedge, i.e. the angle between the two main surfaces, of a proposed wafer and/or of a proposed glass part element may be approximated as follows based on the global Wedge Hw and the global Dome/Bowl $H_d$:

$$\epsilon_{LW}(-R, 0) = \frac{1}{2R}(H_W + 4H_D)$$

$$\epsilon_{LW}(R, 0) = \frac{1}{2R}(H_W - 4H_D)$$

In one embodiment for the specific angle $\epsilon$ the following applies:

$$|\epsilon| \le \max(\epsilon_{LW}) = \frac{1}{2R}(|H_W| + 4|H_D|)$$

Here, R is the radius of the wafer or glass part element under test.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
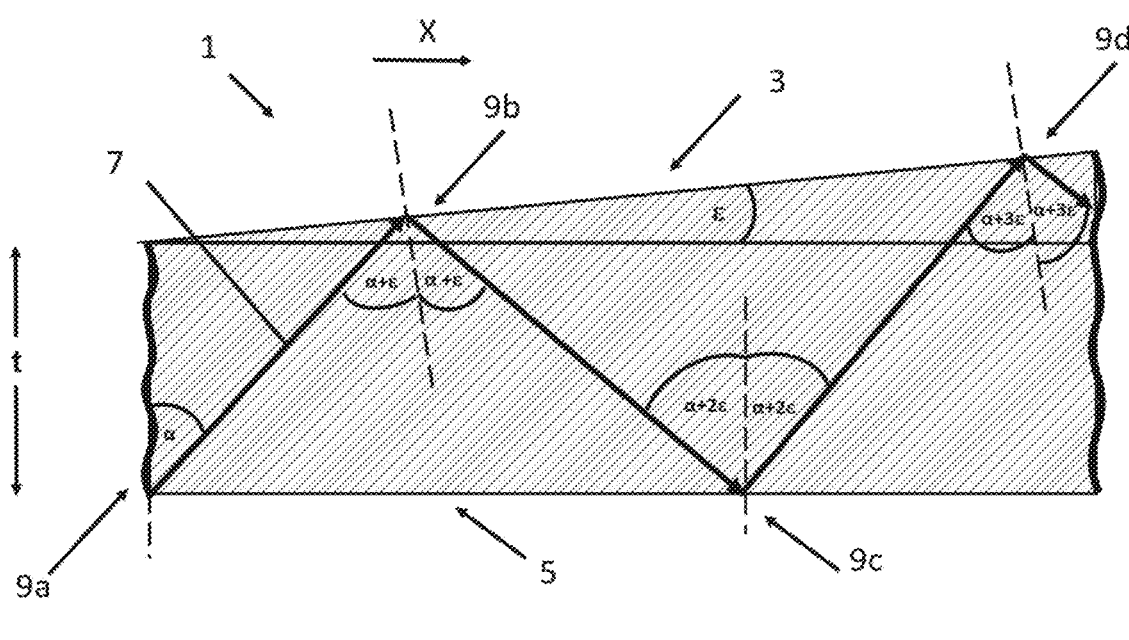
FIG. 1 shows a schematic illustration of a part of a glass wafer according to the second aspect of the invention.

FIG. 1 shows a schematic illustration of a part, such as at least one part of a sub-domain, of a glass wafer 1 according to the second aspect of the present invention in a cross-sectional plane.

The glass wafer 1 has a mean thickness t, a first main surface 3 and a second main surface 5. The first main surface 3 has a slope with respect to the second main surface 5. Due to the slope, the first main surface 3 and the second main surface 5 enclose an angle $\epsilon$. Or in other words, between the normal vector of the first main surface 3 and the normal vector of the second main surface 5 the angle $\epsilon$ is enclosed. If based on a thickness distribution of the glass wafer 1 a Zernike-Polynomial regression is obtained, this angle $\epsilon$ can be obtained. Likewise, from a thickness distribution of sub-domains of the glass wafer 1, the respective specific angle $\epsilon$ can be obtained for that sub-domain from the corresponding Zernike-Polynomial regression.

Within the glass wafer 1 a light beam 7 propagates in FIG. 1 from left to right along a main propagation direction X by way of total inner reflections at the first main surface 3 and the second main surface 5.

In FIG. 1, the light beam 7 encloses an angle $\alpha$ with the normal vector of the second main surface 5, after experiencing a total inner reflection at a certain position 9a at the second main surface 5. Apparently, due to the slope between the two main surfaces 3 and 5, after a further total inner reflection at the position 9b, the angle enclosed between the light beam 7 and the first main surface 3 is $\alpha+\epsilon$. After the next total inner reflection at a position 9c, light beam 7 encloses an angle $\alpha+2\epsilon$ with the normal vector of the second main surface 5. Likewise, after a further total inner reflection at the position 9d, the angle between the light beam 7 and the first main surface 3 is $\alpha+3\epsilon$. And so on.

It is clear from this illustration that due to the slope between the two main surfaces 3 and 5, the angle of total inner reflection of the light beam 7 increases over the propagation path along direction X. In other words, the larger the distance is that the light beam 7 propagates within the glass wafer 1 before it leaves the glass wafer 1 (e.g. via some coupling structures provided on the first main surface 3 which, however, is not shown in FIG. 1), the larger is the last angle of total inner reflection that the light beam 7 has. And, therefore, the larger the angle of release (i.e. the angle enclosed between the released light beam and the normal vector of the first main surface 3 for the case the coupling structure has a refractive index lower than or equal to the one of the glass wafer) is.

For a plurality of sub-domains within the effective domain of the wafer 1, the ratio of the value of |ε| and the value of the specific thickness t (taking into account the refractive index of the glass material), i.e. the local quality index, LQI, is limited, that is, basically the maximal angle of total inner reflection is limited, that is, the maximal angle of total inner reflection for a particular propagation distance.

It is clear for the person skilled in the art that the illustration of the glass wafer 1 shown in FIG. 1 corresponds also to the shape of its thickness distribution. This is especially because the bottom surface is flat. Therefore, the illustration of FIG. 1 can be referred to for both cases: discussing the principles of reflection occurring for the glass wafer 1 and discussion aspects concerning the thickness distribution of the respective wafer 1.

Figure 2:
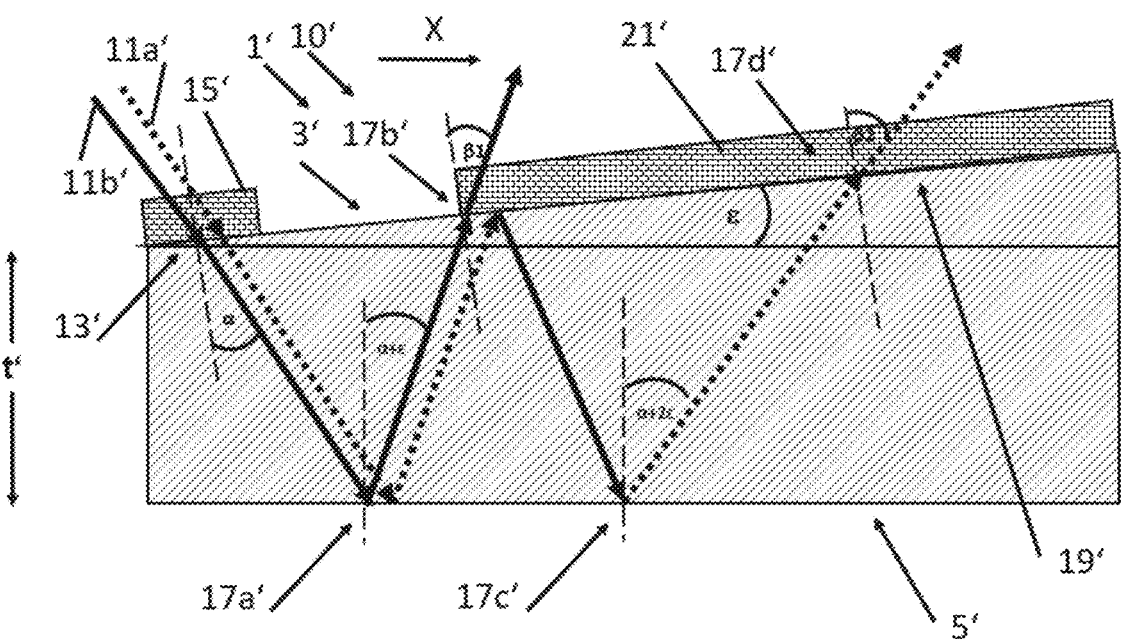
FIG. 2 shows a schematic illustration of a sub-domain of a glass wafer according to the second aspect of the invention.
Figure 3A:
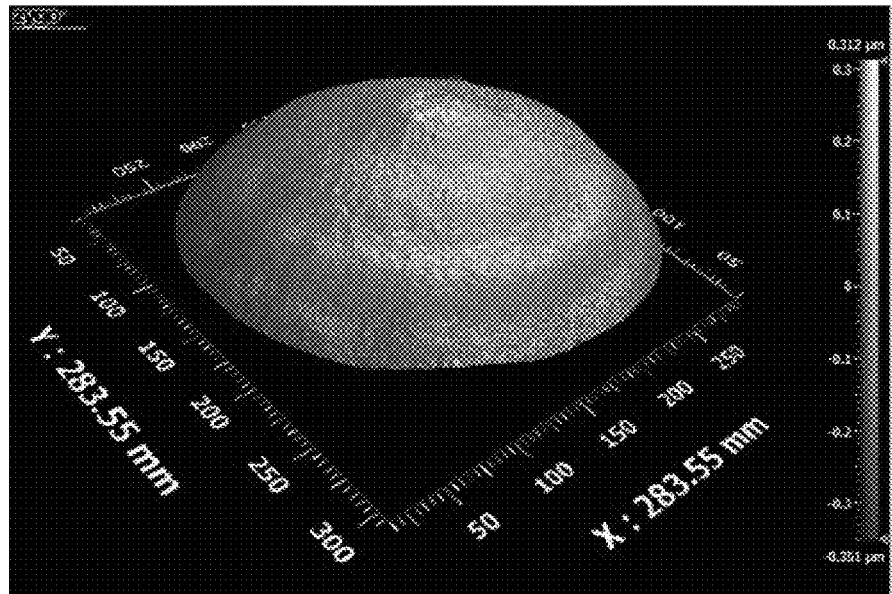
FIGS. 3A, 3B, 4A, 4B, 5A, 5B, 6A, 6B, 7A, 7B, 8A, 8B, 9A, 9B, 10A, 10B, 11A, 11B, 12A, 12B, 13A, and 13B show thickness distribution profiles of different glass wafers according to the second aspect of the invention.
Figure 3B:
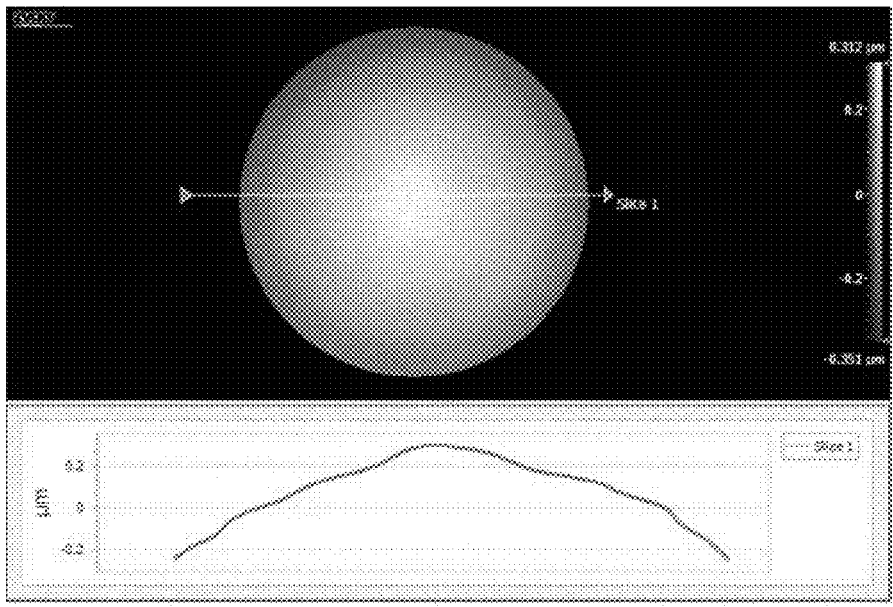
Figure 4A:
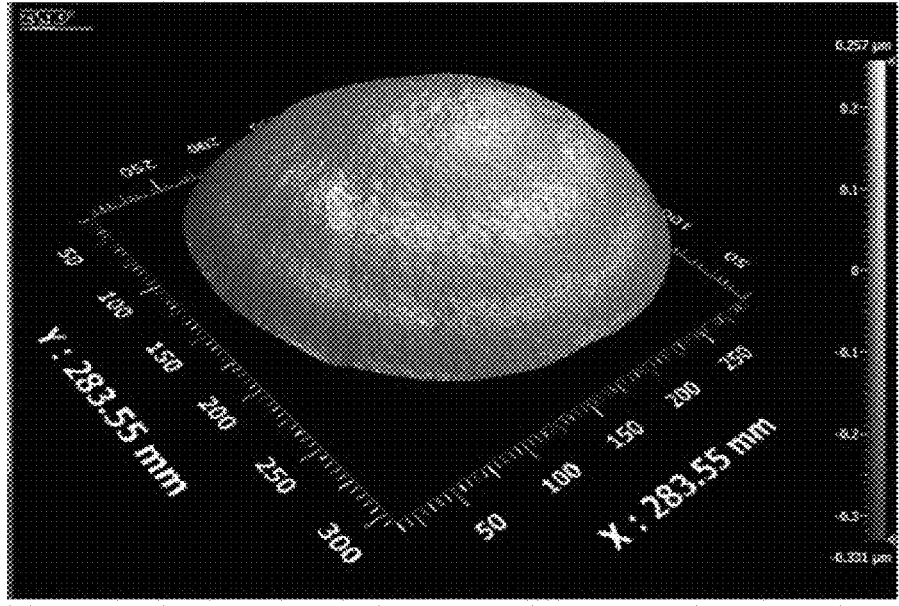
Figure 4B:
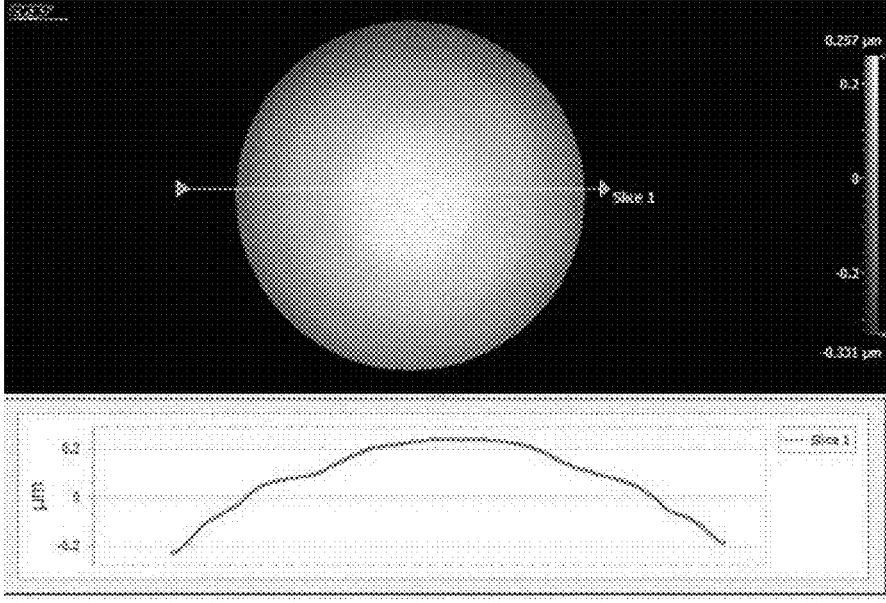
Figure 5A:
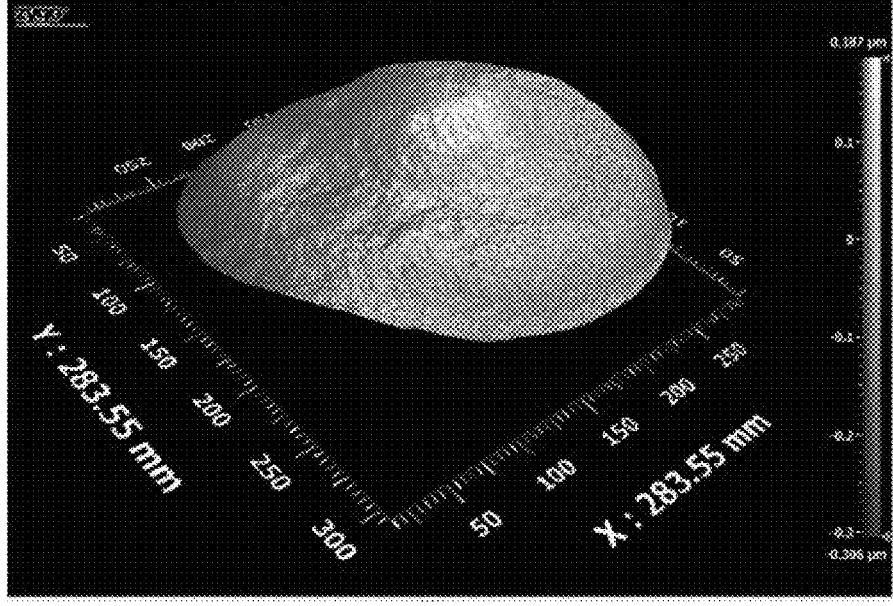
Figure 5B:
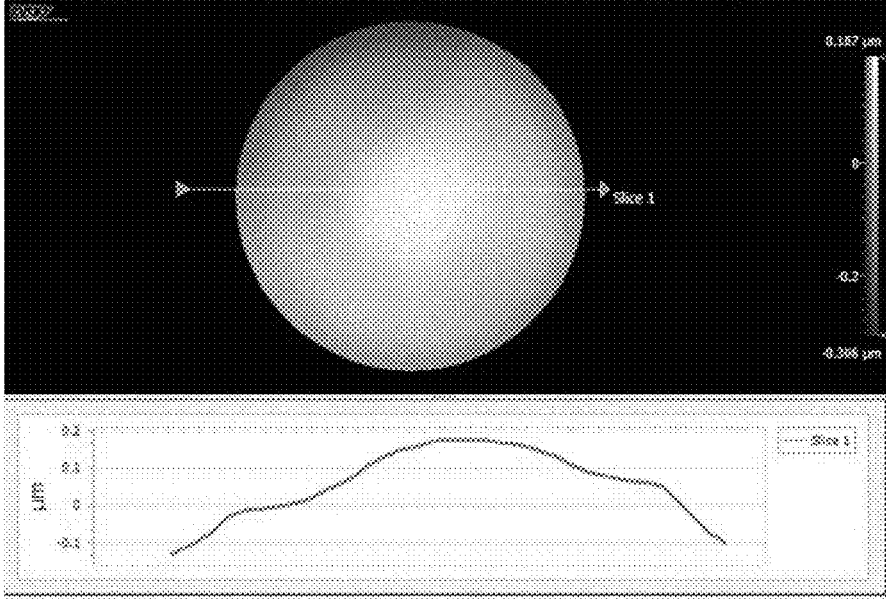
Figure 6A:
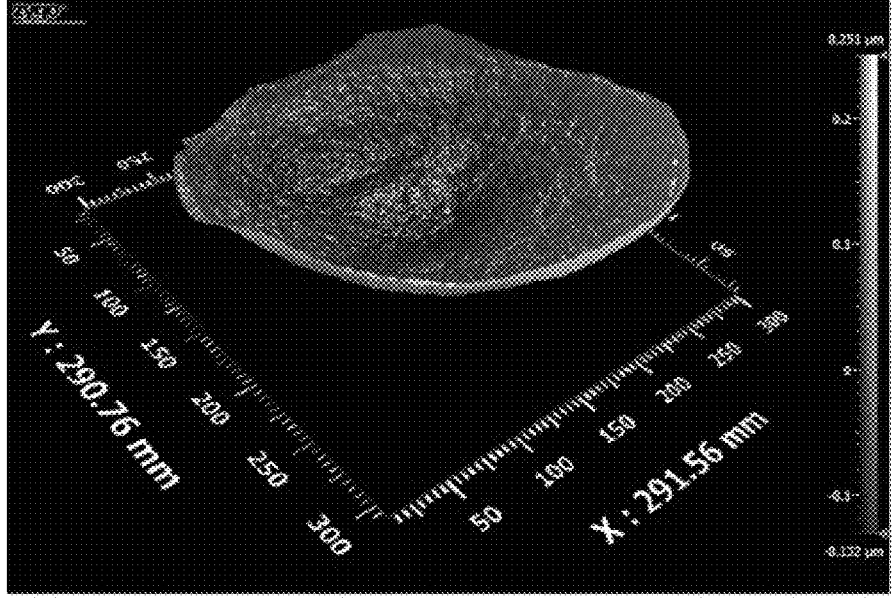
Figure 6B:
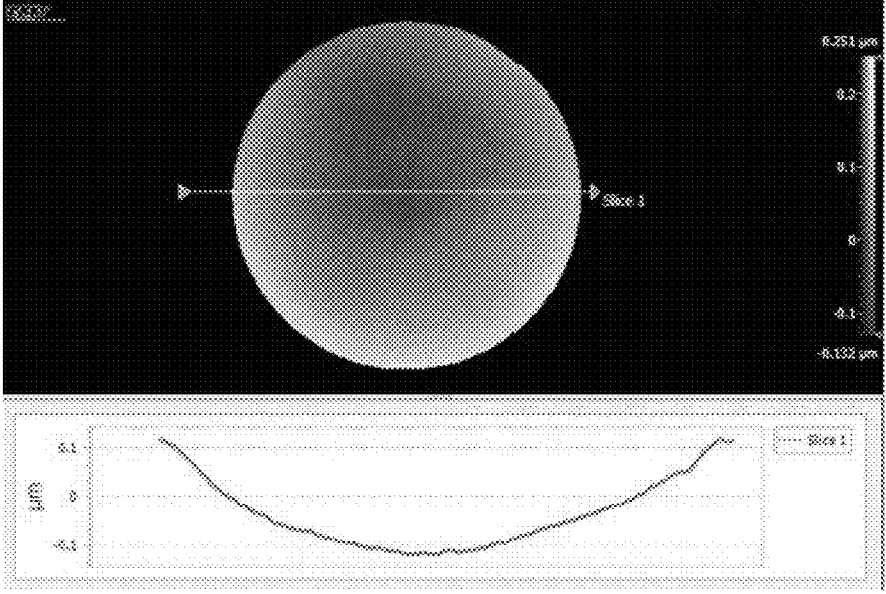
Figure 7A:
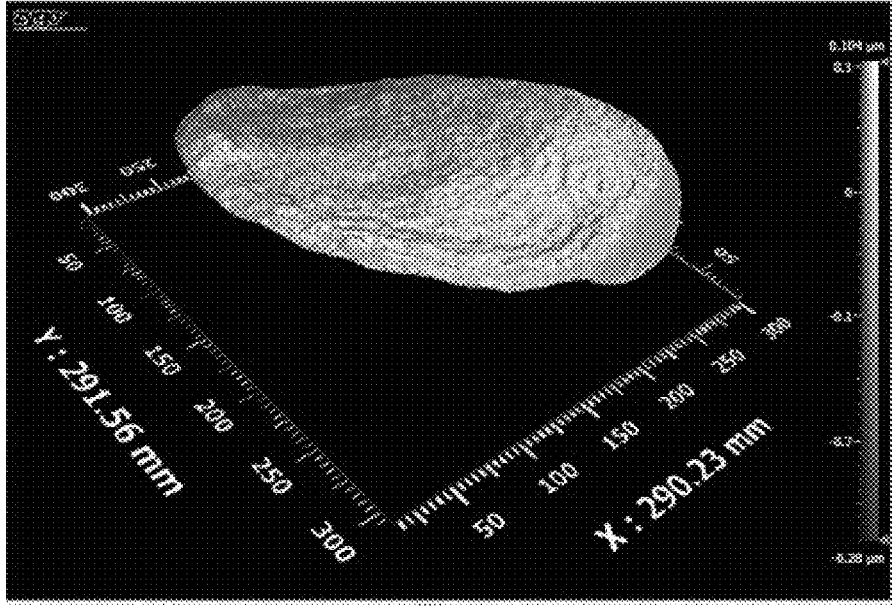
Figure 7B:
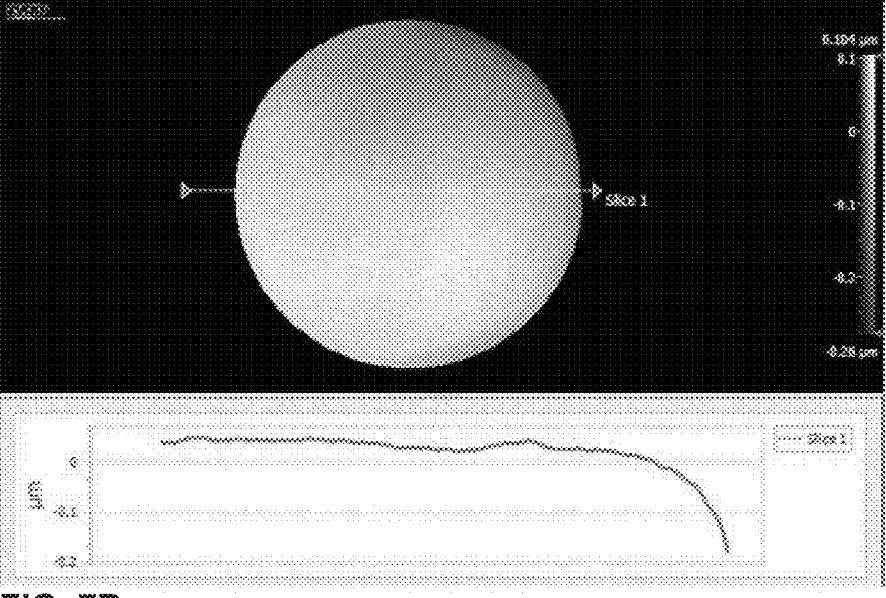
Figure 8A:
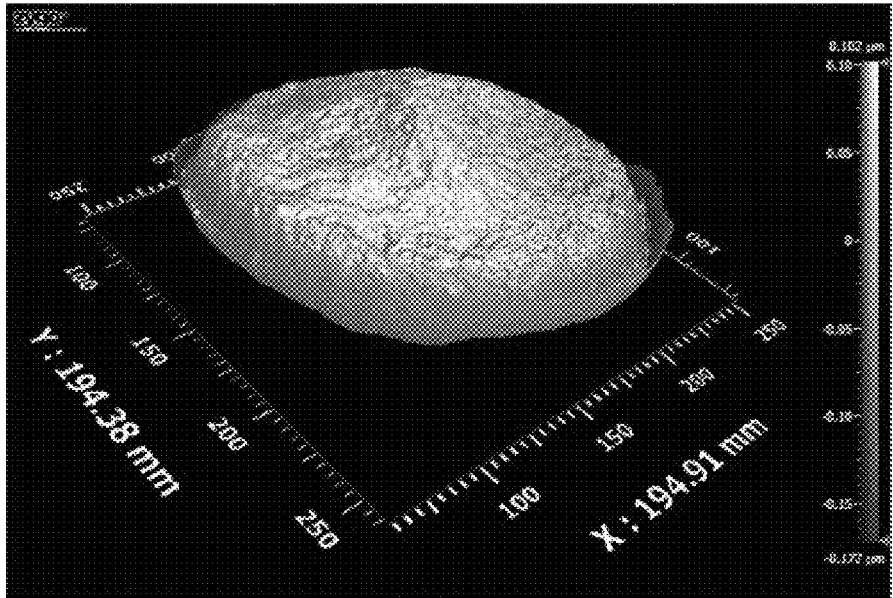
Figure 8B:
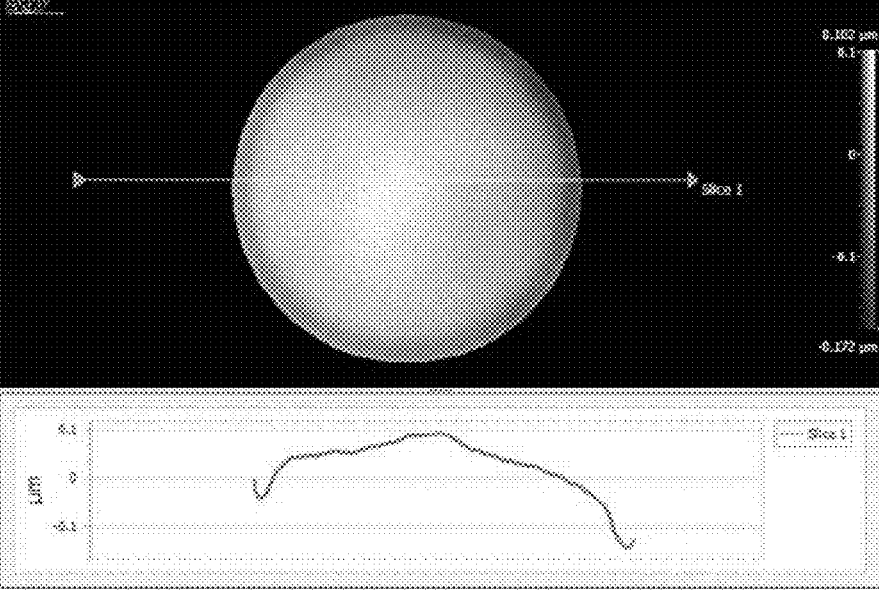
Figure 9A:
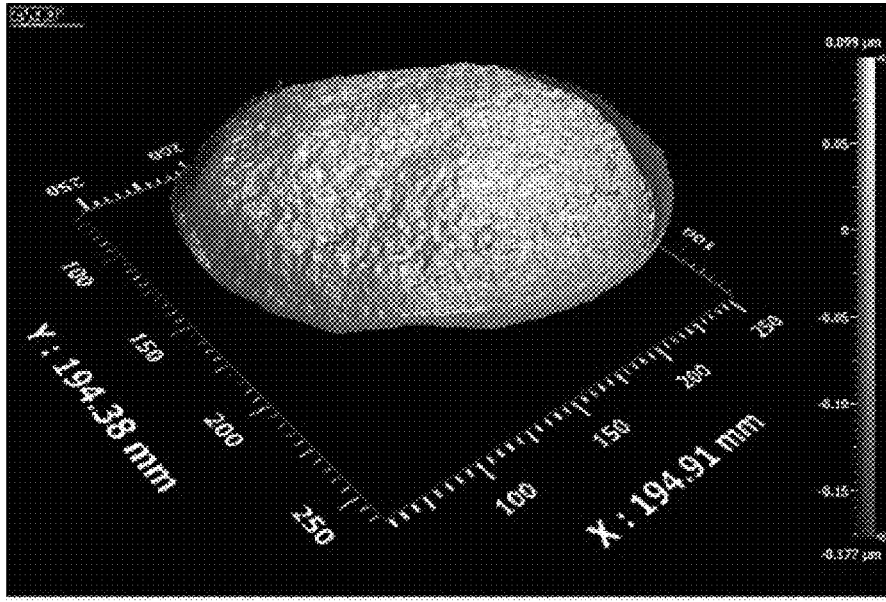
Figure 9B:
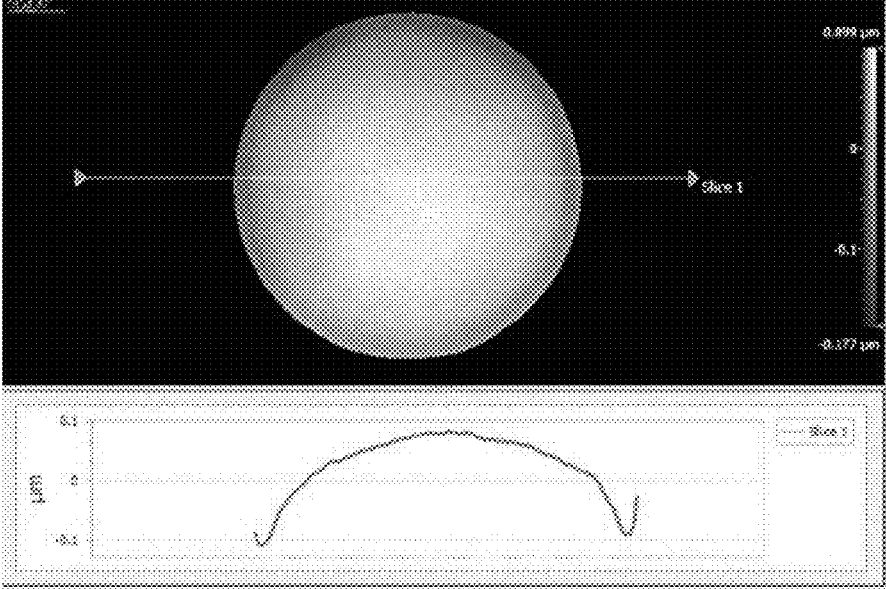
Figure 10A:
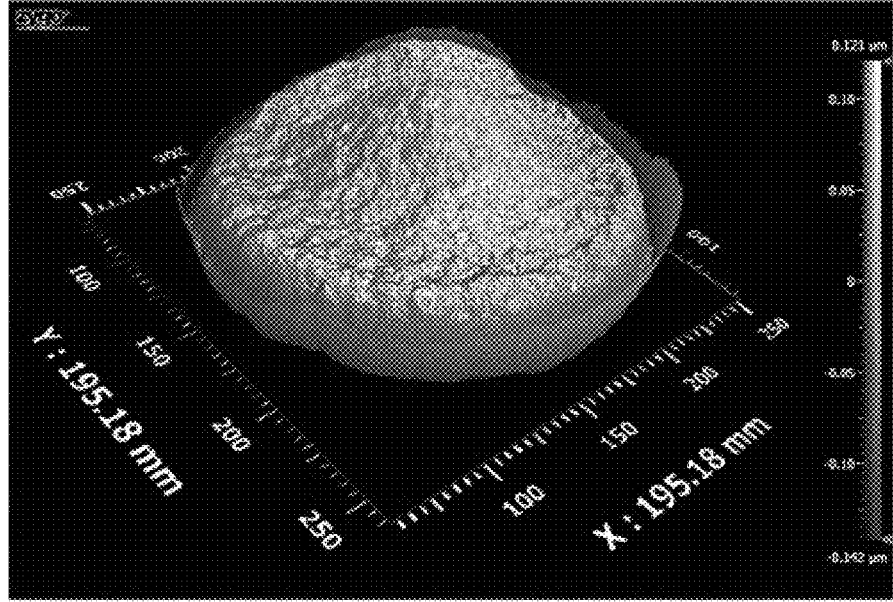
Figure 10B:
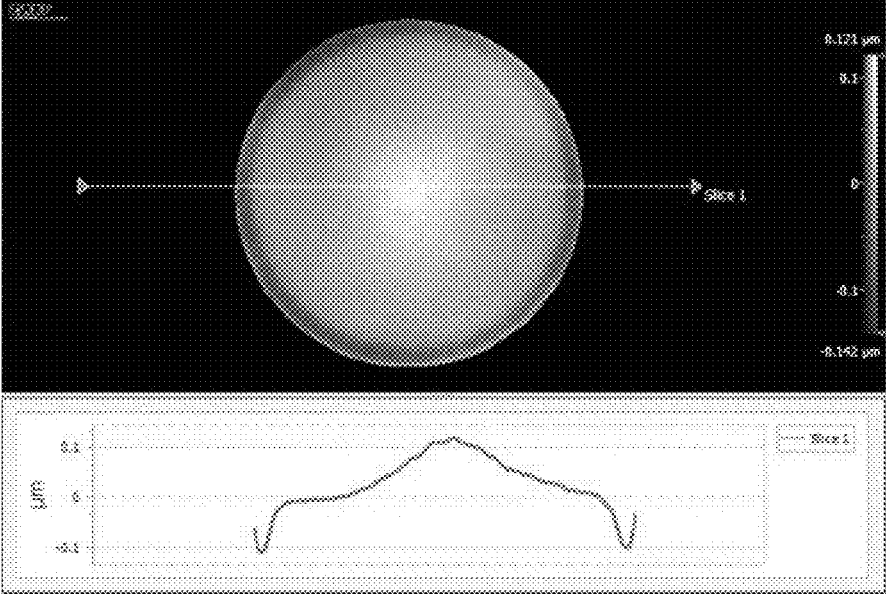
Figure 11A:
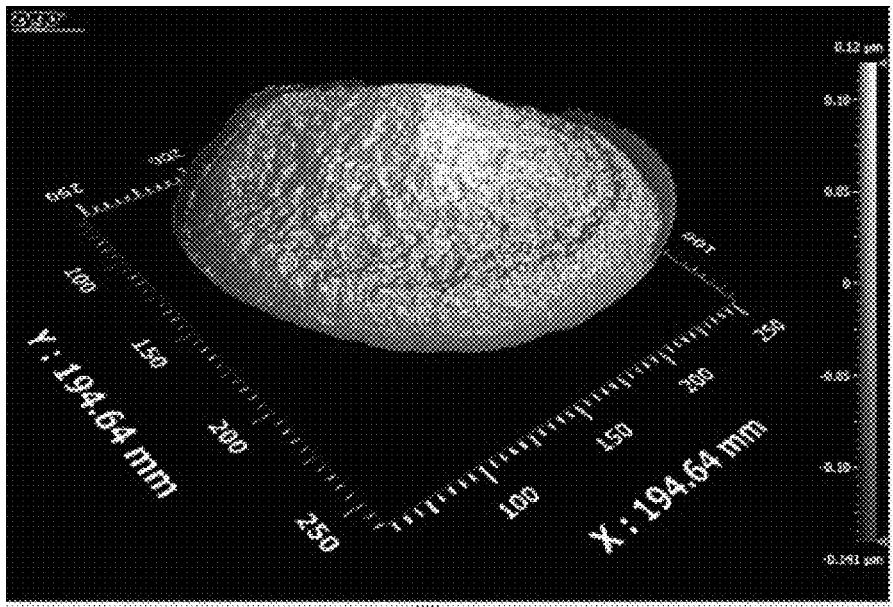
Figure 11B:
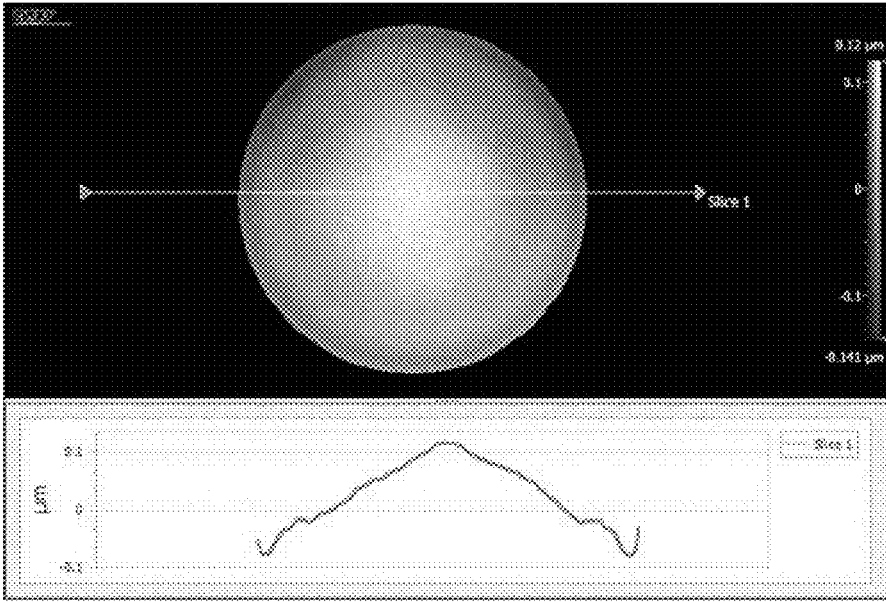
Figure 12A:
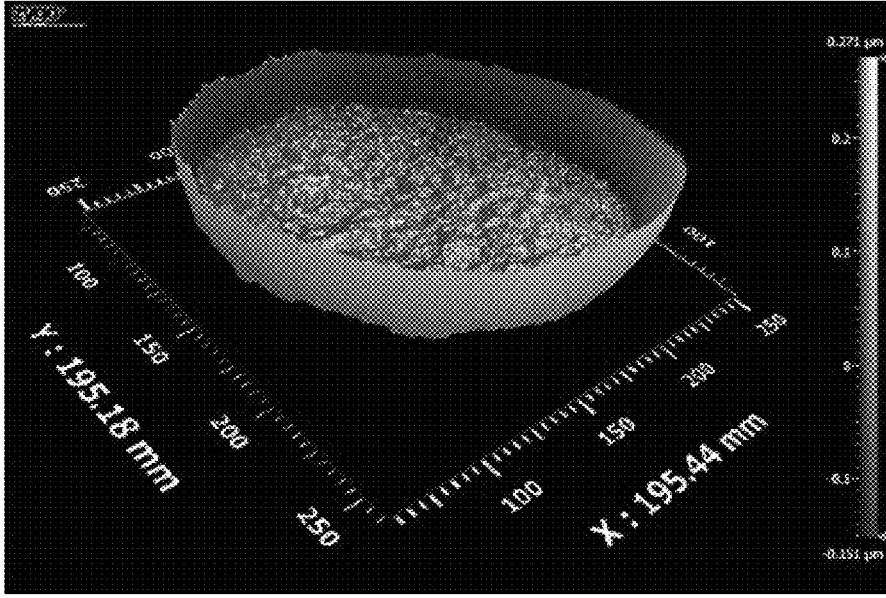
Figure 12B:
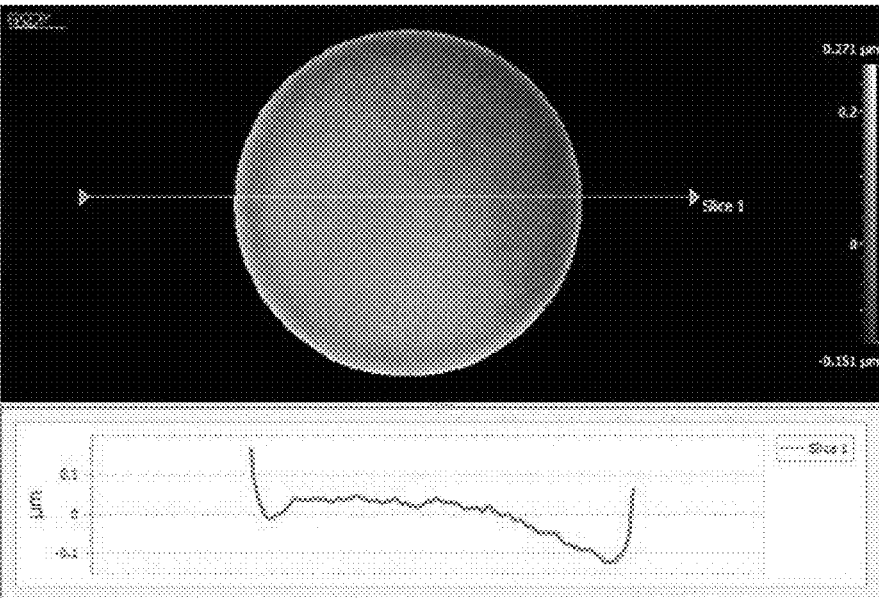
Figure 13A:
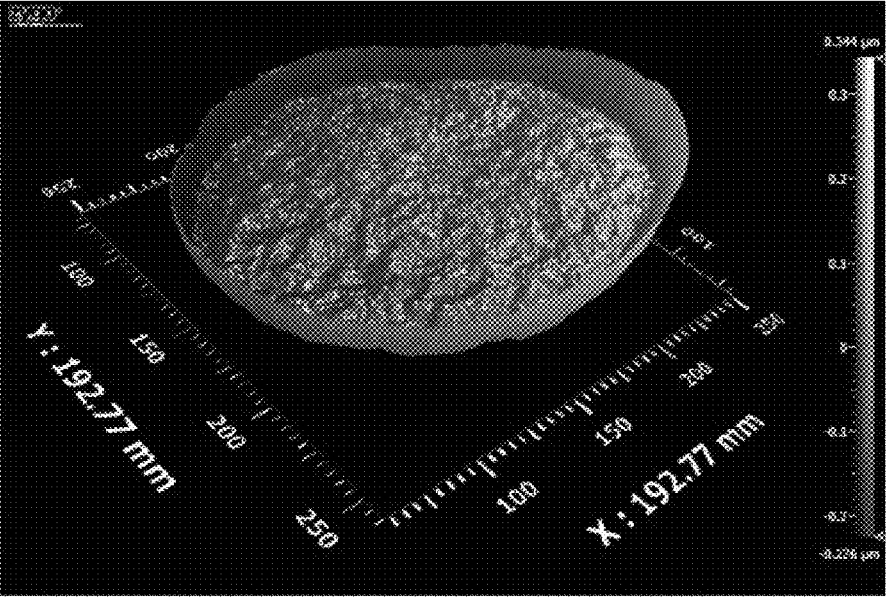
Figure 13B:
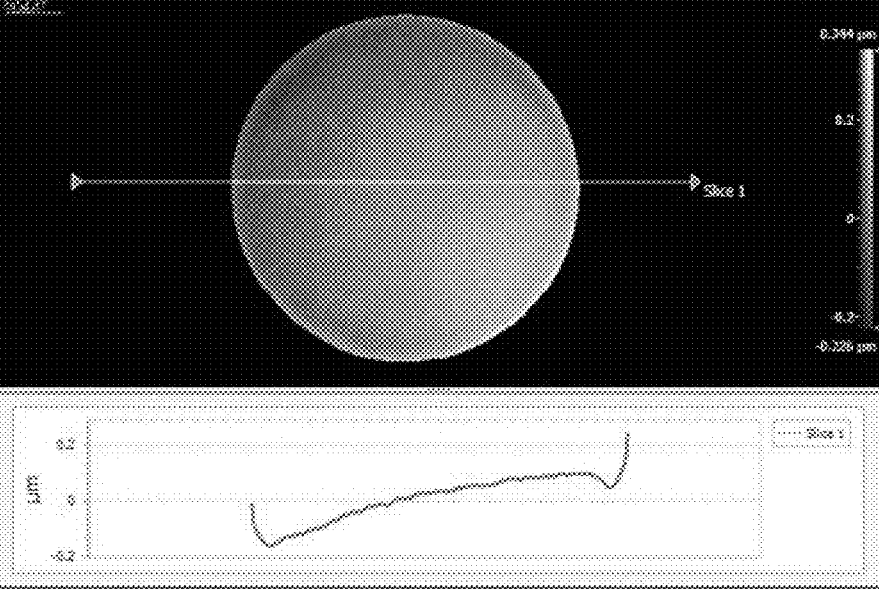

FIG. 2 shows a schematic illustration of a sub-domain 10' of a glass wafer 1' according to the second aspect of the invention in a cross-sectional plane. (Indeed, the sub-domain 10' might correspond to a glass part element according to the third aspect of the invention.) In principle, the glass wafer 1' is similar to the glass wafer 1 described above with respect to FIG. 1. Therefore, for the glass wafer 1' the same structural features as for the glass wafer 1 have same reference signs but single dashed.

It is again noted that the illustration of the sub-domain 10' corresponds at the same time to the thickness distribution of the sub-domain 10'. Therefore, the illustration of FIG. 2 can be referred to for both cases: discussing the principles of reflection occurring for the glass wafer 1' and discussion aspects concerning the thickness distribution of the respective sub-domain.

A bundle of parallel light beams 11a' and 11b' (only two of which are shown in FIG. 2) is coupled at a feeding area 13' of the glass wafer 1'/sub-domain 10' via a first coupling structure 15' into the glass wafer 1'. The light beams correspond to one pixel of the computer-generated visual information. Initially, each light beam 11a', 11b' encloses an angle α with the normal vector of the first main surface 3', i.e. the light beams 11a' and 11b' are parallel to each other. After a first total inner reflection at a position 17a', each light beam 7a', 7b' encloses an angle α+ε with the normal vector of the second main surface 5'. At a position 17b' the light beam 7a' is coupled out of the glass wafer 1' at a releasing area 19' by way of a second coupling structure 21' which covers the releasing area 19'.

The feeding area 13' and the releasing area 19' here correspond to the contact surface between the glass wafer 1' (to be more precise, its first main surface 3') and, respectively, the first coupling structure 15' and the second coupling structure 21'.

In the actual application in AR the coupling structures may be surface gratings to couple light in and out. Then, there is a statistical likelihood that the light beam is coupled out or refracted back and eventually coupled out only after more bounces. It has to be understood that a light beam which hits the releasing area 19' experiences a total inner reflection with a certain probability P1 and is released out of the glass wafer 1' with a certain probability P2, where P1+P2=1 (neglecting minor absorption effects or the like).

While light beam 11a' leaves the glass wafer 1 at a position 17b', the light beam 11b' experiences a further total inner reflection at position 17b' and at position 17c'. At position 17d', light beam 11b' finally also leaves the glass wafer 1' via the second coupling structure 19'.

Since the light beam 11a' experienced in total three total inner reflections, hence, one more than light beam 11b' did, the angle of release β1 enclosed between the normal vector of the first main surface 3' and the light beam 11b' and the angle of release β2 enclosed between the normal vector of the first main surface 3' and the light beam 11a' are different.

The coupling elements 15' and 21' are designed in form of surface-gratings provided on the first main surface 3'. It is noted that the refractions of the light beam entering the coupling structure 15' and leaving the coupling structure 21' have not been illustrated in FIG. 2. In other embodiments, the coupling elements 15' and 21' may be designed in form of prisms made of a glass material having a refractive index which is lower than that of the glass material of the glass wafer 1'.

Since the glass wafer 1' meets the local quality index for the sub-domain 10' shown in FIG. 2, the slope c between the first and second main surfaces 3', 5' of the glass wafer 1' is limited. Therefore, also the difference between the angles of release β1 and β2 is limited, i.e. |β1−β2| is smaller than some threshold value. In other words, although light beams 11a' and 11b' are no longer parallel to each other after leaving the glass wafer 1'/sub-domain 10', they still allow to present the respective pixel of the computer-generated visual information in high visual quality to a person. This is because the two light beams 11a' and 11b' have still a similar angle of release, hence, the light beams 11a' and 11b' still reach the same or nearly the same point on the retina (or in general on some detecting way).

To be more precise, the main surfaces 3', 5' of the wafer 1'/sub-domain 10' are specifically designed with respect to the wedge, hence ε, which is a parameter of the wafer. The glass wafer 1' obtained that way allows a light propagation between the first and second main surfaces 3', 5' with angles of total inner reflection of limited accumulation. Thus, along the extension of the coupling interface 19', the difference between the angles of total inner reflection is restricted to certain limits for the sub-domain shown in FIG. 2.

Again, the specific angle ε can be obtained from the thickness distribution of the sub-domain or glass wafer. At the same time, this angle correspond to the wedge as shown in the FIGS. 1 and 2.

The sub-domain 10' is, therefore, well-suited for AR applications. For example, a glass part element can be cut out from the sub-domain 10' (or it can be directly used as glass part element) which in turn can be used as basic parts for eye-pieces in glasses for AR devices.

FIGS. 3A, 4A, 5A, 6A, 7A, 8A, 9A, 10A, 11A, 12A, 13A each shows the thickness distribution profile of a glass wafer according to the second aspect of the invention, which has been manufactured with a method according to the first aspect of the invention. FIGS. 3B, 4B, 5B, 6B, 7B, 8B, 9B, 10B, 11B, 12B, 13B each shows a top view of the thickness distribution profile. On the top view there is shown superimposed a cutting line. FIGS. 3B, 4B, 5B, 6B, 7B, 8B, 9B, 10B, 11B, 12B, 13B further include the course of the thickness distribution profile of the glass wafer for a slice through the wafer along the cutting line.

The properties of each of the glass wafers concerning its general shape, its diameter Dw, the refractive index N of its glass material for a wavelength of 632.8 nm and its physical thickness t, are listed in the table below. Here, the specific thickness t corresponds to a mean thickness of the glass wafer.

| Glass wafer ID | Representation shown in FIG. . . . | General shape | Diameter Dw [mm] | N [1] | t [mm] |
|---|---|---|---|---|---|
| 1 | 3 | Dom | 300 | 2.0010 | 0.5 |
| 2 | 4 | Dom | 300 | 2.0010 | 0.5 |
| 3 | 5 | Dom | 300 | 2.0010 | 0.5 |
| 4 | 6 | Bowl | 300 | 1.9037 | 0.3 |
| 5 | 7 | Wedge | 300 | 1.9037 | 0.3 |
| 6 | 8 | Dom | 200 | 1.9037 | 0.5 |
| 7 | 9 | Dom | 200 | 1.9037 | 0.5 |
| 8 | 10 | Dom | 200 | 2.0010 | 0.5 |
| 9 | 11 | Dom | 200 | 2.0010 | 0.5 |
| 10 | 12 | Wedge | 200 | 1.9220 | 0.7 |
| 11 | 13 | Wedge | 200 | 1.9220 | 0.7 |

Next, the quality of the wafers with respect to the visual quality of computer-generated visual information is investigated.

For this purpose, for each glass wafer the local quality index, LQI, has been determined for different pluralities of disk-like shaped sub-domains with diameter Ds defined within an effective domain of the respective wafers. The effective domain of each wafer includes the central portion of the respective glass wafer and has a diameter De. In other words, the effective domain corresponds to the part of the wafer with reduced diameter of De.

In the table below the results for the average and maximal LQI for each wafer and for each plurality of sub-domains thereof are shown. To be more precise, for each wafer and for each plurality of sub-domains the mean value of the LQI (across all sub-domains of same diameter Ds for a particular wafer) and the maximal value of the LQI (across all sub-domains of same diameter Ds for a particular wafer) are provided. Of course, the LQI has to be checked for each sub-domain in order to check if the wafer is a proposed wafer.

Here, the maximal extension D of a sub-domain corresponds to the diameter Ds, because the sub-domain is here disk-like shaped.

Indeed, the maximal value of the LQI would be sufficient in order to verify whether the glass wafer is a glass wafer according to the second aspect of the invention, because for all sub-domains the LQI has to be met.

Note that the same glass wafer ID indicates the same glass wafer in both tables.

| Glass wafer ID | Ds [mm] | Number of sub-domains | De [mm] | Mean LQI [arcsec/mm] | Maximum LQI [arcsec/mm] |
|---|---|---|---|---|---|
| 1 | 60 | 48 | 284 | 2.91 | 4.61 |
|   | 40 | 125 | 284 | 3.05 | 5.20 |
|   | 30 | 236 | 284 | 3.15 | 5.44 |
|   | 20 | 559 | 284 | 3.19 | 6.41 |
| 2 | 60 | 48 | 284 | 2.57 | 4.33 |
|   | 40 | 125 | 284 | 2.77 | 4.64 |
|   | 30 | 236 | 284 | 2.84 | 5.10 |
|   | 20 | 559 | 284 | 2.95 | 6.17 |
| 3 | 60 | 48 | 284 | 1.66 | 3.33 |
|   | 40 | 125 | 284 | 1.84 | 4.02 |
|   | 30 | 236 | 284 | 1.94 | 4.44 |
|   | 20 | 559 | 284 | 2.01 | 4.89 |
| 4 | 60 | 48 | 290 | 2.00 | 4.37 |
|   | 40 | 125 | 290 | 2.16 | 4.91 |
|   | 30 | 236 | 290 | 2.27 | 5.35 |
|   | 20 | 559 | 290 | 2.38 | 5.94 |
| 5 | 60 | 48 | 290 | 1.35 | 3.19 |
|   | 40 | 125 | 290 | 1.46 | 4.37 |
|   | 30 | 236 | 290 | 1.57 | 6.53 |
|   | 20 | 559 | 290 | 1.78 | 8.69 |

-continued

| Glass wafer ID | Ds [mm] | Number of sub-domains | De [mm] | Mean LQI [arcsec/mm] | Maximum LQI [arcsec/mm] |
|---|---|---|---|---|---|
| 6 | 60 | 19 | 190 | 1.10 | 2.24 |
|   | 40 | 50 | 190 | 1.13 | 3.01 |
|   | 30 | 94 | 190 | 1.26 | 3.60 |
|   | 20 | 240 | 190 | 1.59 | 5.51 |
| 7 | 60 | 19 | 190 | 1.23 | 2.33 |
|   | 40 | 50 | 190 | 1.39 | 3.30 |
|   | 30 | 94 | 190 | 1.46 | 4.21 |
|   | 20 | 240 | 190 | 1.68 | 5.09 |
| 8 | 60 | 19 | 190 | 1.11 | 1.46 |
|   | 40 | 50 | 190 | 1.18 | 2.43 |
|   | 30 | 94 | 190 | 1.25 | 3.54 |
|   | 20 | 240 | 190 | 1.59 | 5.79 |
| 9 | 60 | 19 | 190 | 1.39 | 2.08 |
|   | 40 | 50 | 190 | 1.46 | 2.53 |
|   | 30 | 94 | 190 | 1.46 | 3.19 |
|   | 20 | 240 | 190 | 1.59 | 3.92 |
| 10 | 60 | 19 | 190 | 0.70 | 1.34 |
|   | 40 | 50 | 190 | 0.77 | 1.48 |
|   | 30 | 94 | 190 | 0.82 | 1.69 |
|   | 20 | 240 | 190 | 0.89 | 2.06 |
| 11 | 60 | 19 | 190 | 1.06 | 1.45 |
|   | 40 | 50 | 190 | 1.10 | 1.78 |
|   | 30 | 94 | 190 | 1.10 | 2.09 |
|   | 20 | 240 | 190 | 1.17 | 2.91 |

According to the results listed in the table above, for example, for the glass wafer ID 1 of diameter Dw=300 mm, a plurality of 48 different sub-domains (each sub-domain having a defined diameter of Ds=60 mm) has been defined within the effective domain of the glass wafer ID 1, the effective domain being a defined central portion of the wafer and having a diameter of De=284 mm. For each of the 48 sub-domains a specific angle ε has been determined based on the thickness distribution profile of that sub-domain. Subsequently, along with the physical mean thickness t of the glass wafer ID 1 (i.e. t=0.5 mm) and the refractive index N of the glass material (i.e. N=2.0010), an LQI for each of the respective sub-domains has been determined. For the glass wafer ID 1, the maximal LQI determined for one of the sub-domains of diameter Ds=60 mm was LQI=4.61 arcsec/mm, while the mean value for the LQI determined across all of the 48 sub-domains of diameter Ds=60 mm was LQI=2.91 arcsec/mm.

Consequently, for sub-domains of diameter Ds=60 mm, all sub-domains have an LQI which is below the threshold value of 360/60 arcsec/mm.

Obviously, the LQI of all sub-domains of all wafers have an LQI which is smaller than 360/60 arcsec/mm. Thus, all of the eleven glass wafers meet the LQI criterion even for sub-domains having the smallest diameter of Ds=20 mm.

All of the glass wafers shown in FIGS. 3A-13B are well-suited for AR application. For example, glass part elements (for example of the size of the defined sub-domains) can be cut out of the glass wafer, hence, serving as basic parts for eye-pieces for glasses in AR devices.

Figure 14:
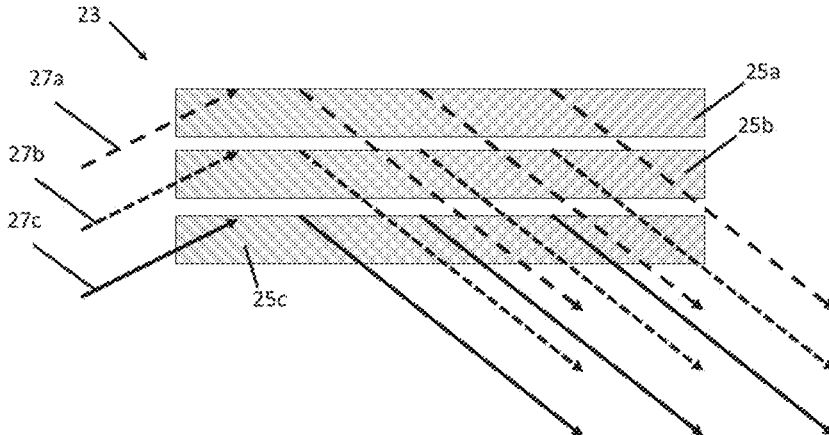
FIG. 14 shows a first stack having three glass part elements.

FIG. 14 shows a stack 23 which includes three glass part elements 25a, 25b and 25c according to the third aspect of the invention. The glass part elements 25a-c are vertically stacked. Here, each glass part element is used for the propagation of a light beam 27a-c of an individual color. The top glass part element 25a is used for red colored light beam transmission. The glass part element 25b in the middle is used for green colored light beam transmission. The bottom glass part element 25c is used for blue colored light beam transmission.

The three light beams 27a, 27b, 27c all correspond to the same pixel of the visual information. Thus, the three light beams 27a, 27b, 27c are initially coupled into the respective glass part element 25a-c parallel to each other. Ideally, the light beams 27a-c are also parallel to each other once they left the respective glass part element 25a-c, hence the stack 23.

This can be ensured in that the change of the angle of total inner reflection during propagation of the light beams 27a-c within the individual glass part elements 25a-c is the same (ideally zero, as it is the case here for stack 23) or at least similar. The similar change of the angle of total inner reflection is achieved in that the glass part elements 25a-c are designed such that the local quality index is met for each glass part element 25a-c. Hence, the change of the angle of the total inner reflection is limited for all light beams 27a-c in all glass part elements 25a-c.

In FIG. 14 each incoming light beam 27a-c has three outgoing light beams for illustration purposes. It is clear, that light beams 27a-c may be a continuous light beam and depending on the probability, light is coupled out at different positions of the respective glass part element 25a-c. In FIG. 14 three outgoing beams are illustrated per glass part element. However, the internal total reflections of the light beams are not shown in FIG. 14.

Figure 15:
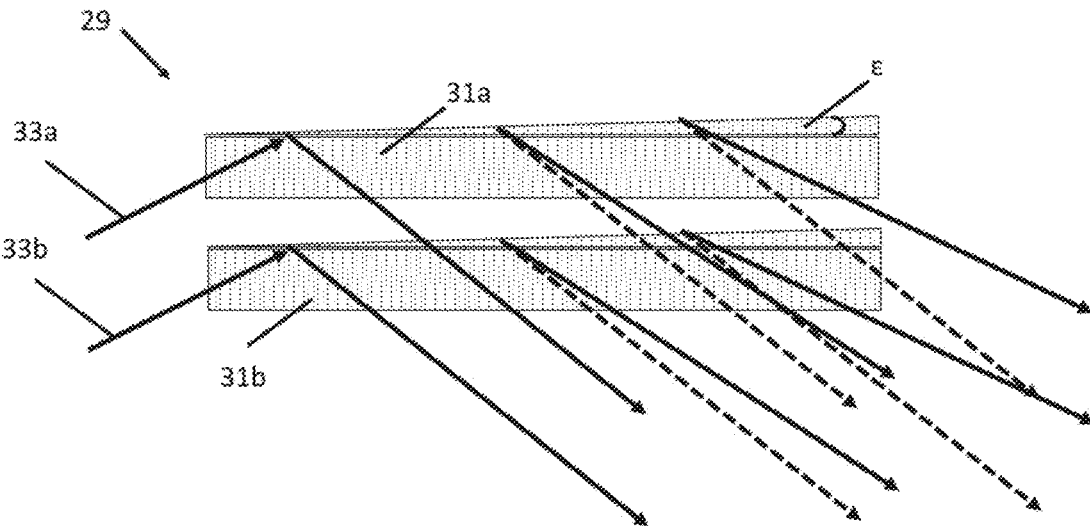
FIG. 15 shows a second stack having two glass part elements.

FIG. 15 shows another stack 29 which includes two identical glass part elements 31a and 31b. In principle the same situation is present for stack 29 as for stack 23 described above with respect to FIG. 14. However, each of the glass part elements 31a, 31b has a wedge, i.e. an angle ε is enclosed between the two (ideally flat) main surfaces of the glass part elements 31a and 31b. As a consequence—and as described above in greater detail—a light beam 33a, 33b which leaves the glass part element after a longer propagation distance within the glass material, hence, experiencing more total inner reflections, has a greater change of the angle of release compared to a light beam which leaves the glass part element earlier (for example via a respective coupling structure, which is not shown here). This is also evident from FIG. 15, where for each glass part element 31a, 31b three outgoing light beams are shown (solid lines) having propagation paths of different length. For example, it can be taken from FIG. 15 in a qualitative manner, that for the glass part element 31a, the third outgoing beam (solid line) encloses a larger angle with the first outgoing beam (dashed line) than the second outgoing beam (solid line) does. The same applies to the glass part element 31b.

For the situation shown in FIG. 15, the wedge is oriented for both glass part elements 31a and 31b in the same manner, i.e., the rising edge is from left to right in FIG. 15 for both glass part elements 31a-b. In this case, all changes of the angle of the total inner reflections occur in the same direction. Hence, the light beams leaving the stack 29 have the same properties (especially angle of release) as they would have for a single glass part element.

Figure 16:
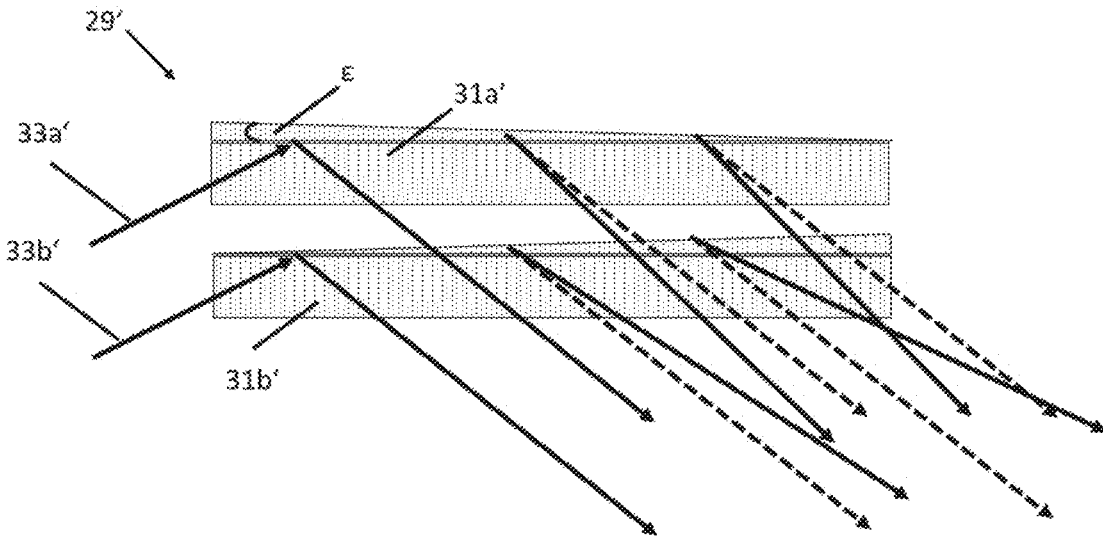
FIG. 16 shows a third stack having two glass part elements.

FIG. 16 shows a stack 29' which is similar to the stack 29 of FIG. 15. Hence, the same structural features have the same reference numerals but single dashed. However, the glass part elements 31a' and 31b' of stack 29' are oriented opposing to one another, i.e. the rising edge is from right to left in FIG. 16 for glass part element 31a and from left to right in FIG. 16 for glass part element 31b. In such a case, each glass part element may contribute not more than 50% of the total error budget. Or, in other words, it might be required to reduce the maximal allowed local quality index for the individual glass part elements, for example reduced by 50% compared to the situation described with respect to stack 29 shown in FIG. 15.

Figure 17:
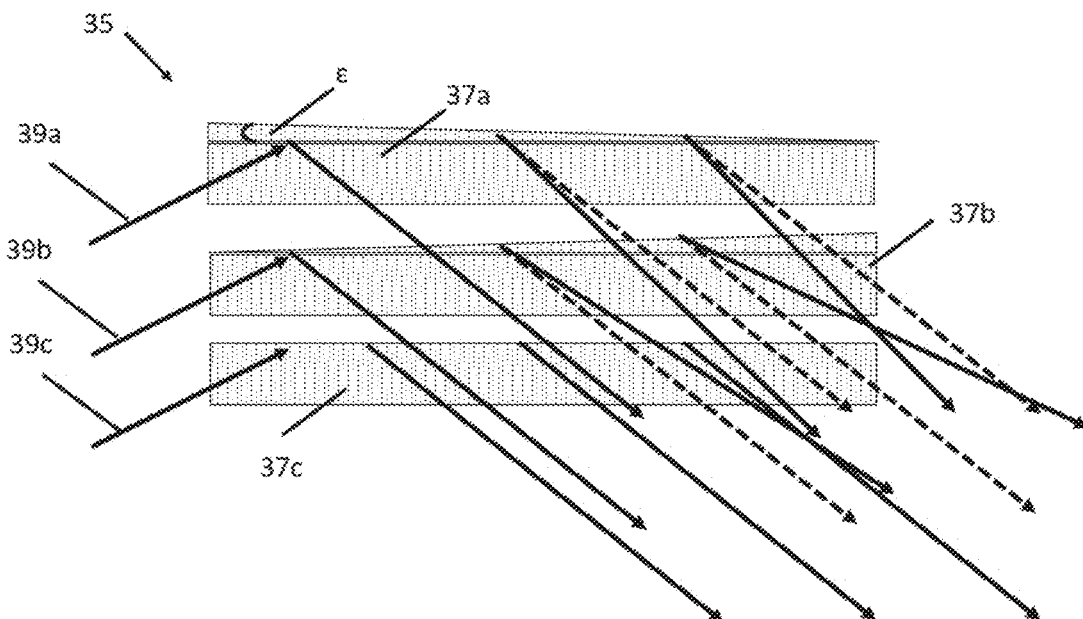
FIG. 17 shows a fourth stack having three glass part elements.

FIG. 17 shows a stack 35 which includes three glass part elements 37a, 37b and 37c. The glass part elements 37a and 37b have a wedge while the glass part element 37c has ideally parallel main surfaces (similar to the glass part elements of stack 23). Also, the three parallel incoming laser beams 39a, 39b and 39c are illustrated. It is evident from FIG. 17 that also for a stack having more than two glass part elements, such as stack 35, the maximal effect of the change of the angle of the total inner reflection is present, if the orientation of the glass part elements 37a and 37b is opposed.

Thus, if two or more glass part elements are included by a stack, it is optional that each glass part element contributes only 50% of the total error budget. Or, in other words, each glass part element has a reduced maximal allowed local quality index, for example reduced by 50%.

Figure 18:
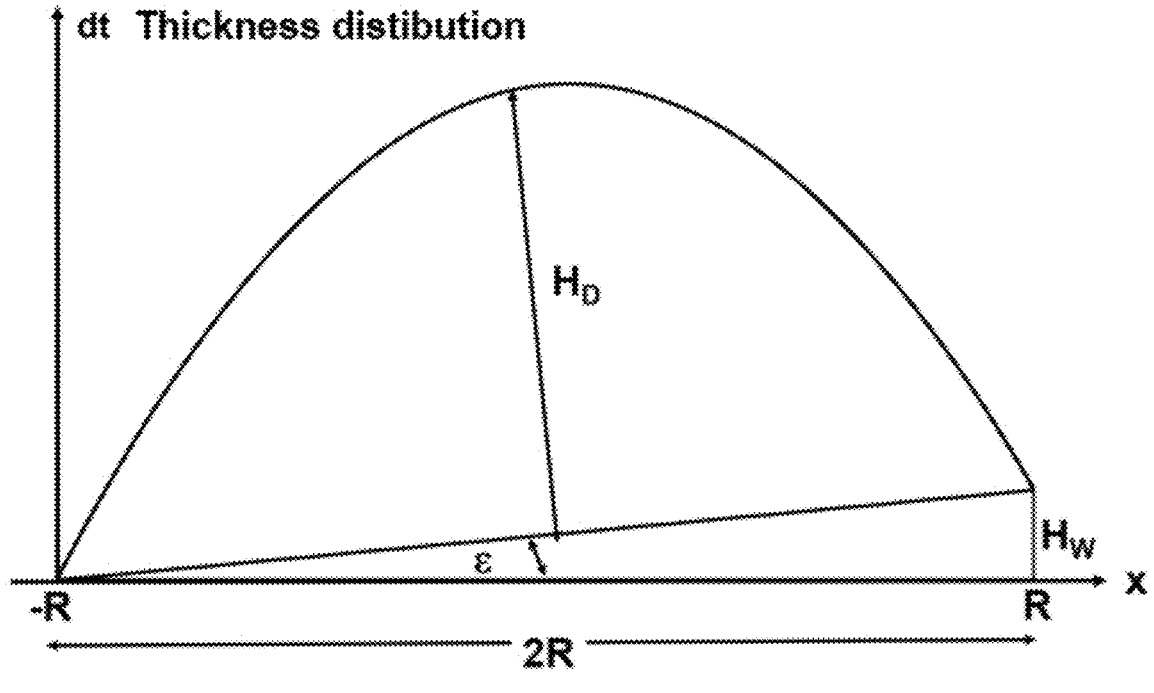
FIG. 18 shows principles of exemplary Wedge and Dome contributions.

FIG. 18 shows principles of exemplary Wedge and Dome contributions, $H_w$ and $H_d$ respectively. To be more precise, FIG. 18 shows a thickness distribution profile of a glass wafer of radius R which has a wedge contribution $H_w$ and a dome contribution $H_d$. The angle ε is the slope angle of the wedge with height $H_w$ and basis 2R.

The features disclosed in the description, the figures as well as the claims could be essential alone or in every combination for the realization of the invention in its different embodiments.

REFERENCES 1, 1' Glass wafer
3, 3' First main surface
5, 5' Second main surface
7 Light beam
9a, 9b, 9c, 9d Position
10' Sub-Domain
11a', 11b' Light beam
13' Feeding area
15' First coupling structure
17a', 17b', 17c', 17d' Position
19' Releasing area
21' Second coupling structure
23 Stack
25a, 25b, 25c Glass part element
27a, 27b, 27c Light beam
29, 29' Stack
31a, 31b, 31a', 31b' Glass part element
33a, 33b, 33a', 33b' Light beam
35 Stack
37a, 37b, 37c Glass part element
39a, 39b, 39c Light beam
$H_d$ Dome contribution
$H_w$ Wedge contribution
t Thickness
R Radius
X Direction
α Angle
β1, β2 Angle of release
ε Angle While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass wafer, comprising:
a first main surface; and
a second main surface opposite the first main surface, a material of the glass wafer having a refractive index N,
wherein, for each of a plurality of sub-domains of a maximal extension D of the glass wafer, the plurality of sub-domains are located within an effective domain of the glass wafer:
from a thickness distribution of the glass wafer between the first main surface and the second main surface of a respective one of the plurality of sub-domains, a specific angle E is configured for being determined, wherein the specific angle F is determined as an angle of a planar contribution to a change in the thickness distribution;
wherein the glass wafer has a maximal thickness of 2 mm or less,
wherein the glass wafer has a specific thickness t,
wherein the glass wafer is configured with respect to at least one parameter of the glass wafer such that for each of the plurality of sub-domains a local quality index LQI of the glass wafer is equal to or smaller than a threshold T, with the threshold T being defined as $$T = \frac{\varepsilon_{max}}{D}$$

wherein $\varepsilon_{max}$ is 360 arcsec or less,
wherein the local quality index LQI is defined as:

$$LQI = \frac{|\varepsilon|}{t}\sqrt{N^2 - 1}.$$

2. The glass wafer according to claim 1, wherein at least one of:
(i) the refractive index N of the material of the glass wafer is at least one of (a) between 1.4 and 3; (b) 1.4 or more; and (c) 3 or less; and
(ii) the material of the glass wafer has the refractive index N for a wavelength of between 587 nm and 588 nm.

3. The glass wafer according to claim 1, wherein at least one of:
(i) a thickness of the glass wafer varies for each of two positions by at most 5000 nms; and
(ii) the maximal thickness of the glass wafer is at least one of:
(a) 1.9 mm or less;
(b) 0.01 mm or more; and
(c) between 0.01 mm and 1.8 mm.

4. The glass wafer according to claim 1, wherein each of the plurality of sub-domains at least one of:
(i) is or is configured for being defined;
(ii) includes at least one part of a body of the glass wafer between and inclusive of the first main surface and the second main surface;
(iii) includes at least one of (a) at least 0.1%, and (b) at most 80%, respectively, of a total glass material of the glass wafer;
(iv) is disk-like shaped;

(v) has a same said maximal extension D; and
(vi) includes in at least one cross-sectional plane a circular, an oval, or a rectangular circumferential shape.

5. The glass wafer according to claim 1, wherein at least one of:
(i) each of the plurality of sub-domains at least one of is of a disk-like shape, of a rectangular shape, and has a same said maximal extension relative to one another;
(ii) the plurality of sub-domains are at least partly overlapping relative to one another; and
(iii) the plurality of sub-domains cover at least one of:
(a) more than 50% of the glass wafer; and
(b) less than 99.9% of the glass wafer.

6. The glass wafer according to claim 1, wherein at least one of:
the maximal extension D of each of the plurality of sub-domains is a respective diameter of a plurality of disk-like sub-domains when the plurality of sub-domains is the plurality of disk-like sub-domains; and
the maximal extension D of each of the plurality of sub-domains is:
(i) 1 mm or more;
(ii) 100 mm or less; and
(iii) between 1 mm and 100 mm.

7. The glass wafer according to claim 1, wherein the effective domain at least one of:
(i) is or is configured for being defined;
(ii) includes at least one part of a body of the glass wafer between and inclusive of the first main surface and the second main surface;
(iii) includes at least one of (a) at least 10%, and (b) at most 99.99% a total glass material of the glass wafer;
(iv) is disk-like shaped; and
(v) includes in at least one cross-sectional plane a circular, an oval, or a rectangular circumferential shape.

8. The glass wafer according to claim 1, wherein the specific thickness t is a minimal thickness, the maximal thickness, and/or a mean thickness of the glass wafer.

9. The glass wafer according to claim 1, wherein the planar contribution is determined by a contribution of orders 1 and 2 of an expression of the thickness distribution using a least-squares-approximation with Zernike-Polynomials, and wherein the orders 1 and 2 are expressed by an indexing scheme of James C. Wyant.

10. The glass wafer according to claim 1, wherein the at least one parameter is selected from the group comprising:
a global wedge;
at least one of a global dome and a global bowl;
a topology of the first main surface;
a topology of the second main surface;
the maximal thickness of the glass wafer at least within the effective domain;
a minimal thickness of the glass wafer at least within the effective domain;
a thickness variation of the glass wafer at least within the effective domain;
a roughness of the first main surface; and
a roughness of the second main surface.

11. The glass wafer according to claim 1, wherein the $\varepsilon_{max}$—which is a specific angle $\varepsilon_{max}$—is 300 arcsec or less.

12. The glass wafer according to claim 1, wherein the local quality index LQI of the glass wafer is equal to or larger than 0.001 arcsec/mm.

13. The glass wafer according to claim 1, wherein the glass wafer forms, at least within the effective domain, an optical light guide.

14. The glass wafer according to claim 1, wherein the glass wafer is configured such that a plurality of light beams which are parallel or quasi-parallel relative to one another and which are coupled into any of the plurality of sub-domains at a feeding point of a respective one of the plurality of sub-domains under an angle of incidence propagates within the respective one of the plurality of sub-domains along a propagation path by experiencing a plurality of total inner reflections at the first main surface and the second main surface until the light beams are released out of the respective one of the plurality of sub-domains at an end point of the glass wafer under an angle of release, wherein a difference between a plurality of the angle of release for at least two of the plurality of light beams is at least one of (a) equal to or smaller than 120 arcsec, and (b) equal to or larger than 0.001 arcsec.

15. The glass wafer according to claim 14, wherein at least one of:

(i) the plurality of light beams have a wavelength of between 587 nm and 588 nm;

(ii) the plurality of light beams are coupled into the respective one of the plurality of sub-domains at the feeding point by way of at least one first coupling structure of the glass wafer; and (iii) the plurality of light beams are coupled out of the respective one of the plurality of sub-domains at the end point by way of at least one second coupling structure.

16. The glass wafer according to claim 1, wherein the material of the glass wafer is a glass material which comprises the following components in weight percent (wt.-%):

| | |
|---|---|
| $SiO_2$ | 0-30 |
| $P_2O_5$ | 0-25 |
| $B_2O_3$ | 0-20 |
| $Na_2O$ | 0-15 |
| $K_2O$ | 0-10 |
| CaO | 0-5 |
| BaO | 0-25 |
| ZnO | 0-15 |
| $La_2O_3$ | 0-50 |
| $Gd_2O_3$ | 0-10 |
| $Y_2O_3$ | 0-5 |
| $ZrO_2$ | 0-10 |
| $TiO_2$ | 0-30 |
| $Nb_2O_5$ | 0-50. |

* * * * *